US009058761B2

(12) United States Patent
Piasecki et al.

(10) Patent No.: US 9,058,761 B2
(45) Date of Patent: Jun. 16, 2015

(54) SYSTEM AND METHOD FOR LCD LOOP CONTROL

(75) Inventors: Douglas Piasecki, Austin, TX (US); Thomas S. David, Austin, TX (US); Timothy Thomas Rueger, Austin, TX (US); Stefan Mastovich, Austin, TX (US); Jia-Hau Liu, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1146 days.

(21) Appl. No.: 12/495,564

(22) Filed: Jun. 30, 2009

(65) Prior Publication Data

US 2010/0328295 A1 Dec. 30, 2010

(51) Int. Cl.
*G06F 3/038* (2013.01)
*G09G 3/04* (2006.01)

(52) U.S. Cl.
CPC ............ *G09G 3/04* (2013.01); *G09G 2330/021* (2013.01)

(58) Field of Classification Search
CPC ........................................................ G09G 3/04
USPC ........................................... 345/212, 204, 87
See application file for complete search history.

(56) References Cited

U.S. PATENT DOCUMENTS 4,328,490 A 5/1982 Usuba et al.
4,758,069 A 7/1988 Knothe et al.
5,553,296 A 9/1996 Forrest et al.
5,808,505 A 9/1998 Tsukada
5,835,434 A 11/1998 Hirayama
5,861,861 A 1/1999 Nolan et al.
6,016,081 A 1/2000 O'Shaughnessy
6,236,386 B1 5/2001 Watanabe
6,343,044 B1 1/2002 Hsu et al.
6,351,190 B1 2/2002 O'Toole et al.
6,359,809 B1 3/2002 Tedrow et al.
6,429,732 B1 8/2002 Tedrow et al.
6,661,410 B2 12/2003 Casebolt et al.
6,778,002 B2 8/2004 Miyazaki et al.
6,839,052 B1 1/2005 Kramer
6,867,637 B2 3/2005 Miyazaki et al.
6,992,508 B2 1/2006 Chow
7,057,611 B2 6/2006 Lin et al.
7,317,627 B2 1/2008 Endo et al.
7,321,755 B2 1/2008 Hulvey
7,728,823 B2 6/2010 Lyon et al.
8,274,466 B2 9/2012 David et al.
2001/0008430 A1 7/2001 Carr et al.
2001/0023489 A1 9/2001 Liu et al.
2001/0041548 A1 11/2001 Bult et al.
2002/0070794 A1 * 6/2002 Gariboldi et al. ............. 327/540

(Continued)

OTHER PUBLICATIONS

U.S. Appl. No. 12/495,576, filed Jun. 2009, Piasecki et al.

(Continued)

*Primary Examiner* — Amare Mengistu
*Assistant Examiner* — Sarvesh J Nadkarni

(57) ABSTRACT

An LCD controller includes a charge pump for generating a charge voltage responsive to an external voltage and a clock signal. The controller further includes an oscillator for generating the clock signal responsive to an oscillator control signal. An LCD driver voltage circuit generates a plurality of LCD driver voltages for driving segments of an associated LCD display. A loop control circuit within the LCD controller monitors an LCD driver voltage from the LCD driver voltage circuit and generates the oscillator control signal responsive thereto to enable and disable the oscillator.

18 Claims, 13 Drawing Sheets

(56) References Cited

U.S. PATENT DOCUMENTS

| | | | | |
|---|---|---|---|---|
| 2002/0097208 | A1 | 7/2002 | Hashimoto | |
| 2003/0060176 | A1 | 3/2003 | Heinonen et al. | |
| 2003/0151616 | A1 | 8/2003 | Morita | |
| 2003/0161171 | A1 * | 8/2003 | Haeberli et al. | 365/45 |
| 2004/0023680 | A1 | 2/2004 | Hulvey | |
| 2004/0113907 | A1 | 6/2004 | Lee et al. | |
| 2004/0189095 | A1 | 9/2004 | Lin et al. | |
| 2006/0158588 | A1 | 7/2006 | Uh et al. | |
| 2006/0256065 | A1 * | 11/2006 | Jung | 345/100 |
| 2007/0109247 | A1 | 5/2007 | Koyama et al. | |
| 2008/0049480 | A1 | 2/2008 | Endo et al. | |
| 2008/0062148 | A1 | 3/2008 | Hotelling et al. | |
| 2008/0100557 | A1 | 5/2008 | Sheu | |
| 2008/0158183 | A1 | 7/2008 | Hotelling et al. | |
| 2008/0259017 | A1 | 10/2008 | Wright et al. | |
| 2008/0291770 | A1 | 11/2008 | Ishikawa | |
| 2008/0298476 | A1 * | 12/2008 | Bereza et al. | 375/257 |
| 2009/0140969 | A1 * | 6/2009 | Yamagata et al. | 345/100 |

OTHER PUBLICATIONS

U.S. Appl. No. 12/146,349, filed Jun. 2009, David et al.

U.S. Appl. No. 12/241,812, filed Sep. 2008, David et al.

U.S. Appl. No. 12/241,800, filed Sep. 2008, Bar et al.

Office communication in U.S. Appl. No. 12/495,576, dated Apr. 28, 2014, 15 pages.

Office communication in U.S. Appl. No. 12/495,576, dated Sep. 17, 2013, 11 pages.

Office communication in U.S. Appl. No. 12/495,576, dated Dec. 19, 2012, 10 pages.

Office communication in U.S. Appl. No. 12/146,349, dated May 22, 2012, 43 pages.

Office communication in U.S. Appl. No. 12/146,349, dated Nov. 1, 2011, 21 pages.

Office communication in U.S. Appl. No. 12/146,349, dated Apr. 22, 2011, 19 pages.

Office communication in U.S. Appl. No. 12/241,812, dated Apr. 2, 2013, 24 pages.

Office communication in U.S. Appl. No. 12/241,812, dated Apr. 25, 2012, 26 pages.

Office communication in U.S. Appl. No. 12/241,812, dated Oct. 17, 2011, 24 pages.

Office communication in U.S. Appl. No. 12/241,800, dated Mar. 20, 2012, 15 pages.

Office communication in U.S. Appl. No. 12/397,616, dated Feb. 8, 2012, 7 pages.

Office communication in U.S. Appl. No. 12/495,600, dated Sep. 18, 2013, 10 pages.

Office communication in U.S. Appl. No. 12/495,600, dated Dec. 19, 2012, 11 pages.

U.S. Appl. No. 12/495,600, filed Jun. 30, 2009, Piasecki et al.

U.S. Appl. No. 12/397,616, filed Sep. 25, 2012, David et al.

* cited by examiner

SYSTEM AND METHOD FOR LCD LOOP CONTROL

CROSS-REFERENCE TO RELATED APPLICATIONS

N/A

TECHNICAL FIELD

The present application relates to LCD controllers, and more particularly, to a system and method for loop control of an LCD controller.

BACKGROUND

Electronic circuit design often requires the use of various interface circuitries such as liquid crystal displays (LCDs) and capacitive sensor arrays that enable the user to interact with or receive information from an electronic circuit. Typically, LCD displays are driven by dedicated LCD driver controllers which enable a circuit to control an LCD display to display desired information on the segments of the LCD display. Similarly, dedicated sensing circuitry may be used to detect the activation of various capacitive switches within a capacitive sensor array enabling a user to input particular information into a circuit.

An additional requirement of many capacitive switch sensing circuitries is the ability to connect to each of the capacitive switches within an array and this, of course, requires a large number of I/O pins to be associated with the capacitive sensing circuitries. The requirements of a large number of I/O pins dedicated to each capacitive switch, dedicated capacitive sensing circuitry and LCD driver controller circuitry can result in an increase in chip size in order to include all of these components. Therefore, there is a need for circuit designers to have the ability to more conveniently implement capacitive sensor arrays and LCD drivers within circuit designs that do not require the complexities and space limitations associated with existing dedicated circuitries.

With any electronic device such as an LCD controller, it is often desirable to be able to maintain certain functionalities of the controller in a powered state under certain circumstances while limiting other functionalities in order to conserve power. One example of this with respect to an LCD controller is when the LCD controller is generating a particular continuous display that does not change for long periods of time. In this case, it would be desirable to maintain the continuously occurring display while minimizing the power consumption by the components within the controller.

SUMMARY

The present invention, as disclosed and described herein, in one aspect thereof, comprises an LCD controller. The LCD controller includes a charge pump for generating a charge voltage responsive to an external voltage and a clock signal. An oscillator generates the clock signal responsive to an oscillator control signal. An LCD driver voltage circuit generates a plurality of LCD driver voltages for driving segments of an associated LCD display. A loop control circuit monitors the LCD driver voltage from the LCD driver voltage circuit and generates the oscillator control signal responsive thereto to enable and disable the oscillator.

BRIEF DESCRIPTION OF THE DRAWINGS

For a more complete understanding, reference is now made to the following description taken in conjunction with the accompanying Drawings in which.

DETAILED DESCRIPTION

Figure 1:
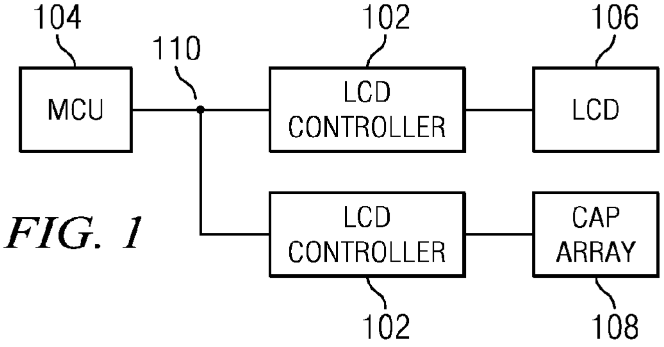
FIG. 1 is a functional block diagram of a plurality of LCD controller chips connected as slave devices to a microcontroller unit.

Referring now to the drawings, wherein like reference numbers are used herein to designate like elements throughout, the various views and embodiments of a system and method for LCD loop control are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated a functional block diagram of a plurality of LCD controller chips 102 that are connected as slave devices to a controlling microcontroller unit (MCU) 104. The MCU 104 can comprise any number of microcontroller units having master control capabilities. The LCD controllers 102 may interface with the microcontroller unit 104 via either a SPI interface or SMbus interface in the slave mode. The LCD controllers 102 may be connected to an LCD display 106 or, alternatively, may be connected to a capacitor switch array 108 using included capacitive sensor functionalities and LCD control functionalities. The LCD controllers 102 may also be used as a GPIO expander.

The MCU 104 is operable to selectively control each of the LCD controllers 102. In general, each of the LCD controllers 102 is addressable via the interconnection therewith through a communication bus 110. This communication bus 110, as will be described herein below, can be a parallel communication bus or a serial communication bus. Each of the LCD controllers 102 is addressable such that data can be transferred to or from each LCD controller 102. These LCD controllers 102 can be enabled or disabled, placed into a low power mode, or into a full power mode. They can each be configured to operate in accordance with a predetermined port configuration information. For example, the LCD controller 102 having the LCD 106 associated therewith is configured as such, although both LCD controllers 102 are substantially identical. Once configured, the LCD controller 102 has data transmitted thereto from the MCU 104 for storage therein which is then used to drive the LCD 106 in the appropriate manner. Generally, when information is sensed from the capacitor array 108 by the LCD controller in a scanning operation, an interrupt will be provided, which interrupt is passed back to the MCU 104 through the bus 110 (the bus 110 includes address, control and data information). Thus, the LCD controller 102 operates independent of the MCU 104 during the scanning operation of the capacitor array 108. Once the capacitor array 108 has sensed a touch or a depression of a button, the LCD controller 102 will receive an indication of such, i.e., a "hit," and an interrupt will be generated. Once the interrupt is generated, the MCU 104 accesses a register in the LCD controller 102 for the purpose of determining which area was touched on the capacitor array 108.

Each of the LCD controllers 102 can be placed into a low power mode where all the power is removed internally except for essential parts thereof. For example, the LCD controller 102 associated with the capacitor array 108 could be placed into a low power mode where the capacitor array was merely scanned. The remainder of the chip can be turned off until an interrupt is generated. Once the interrupt is generated, the LCD controller 102 will be powered back up, i.e., enabled, by the MCU 104 after it receives the interrupt. At this time, the LCD controller 102 will receive program instructions from the MCU 104 to reconfigure the LCD controller 102 in such a manner so as to clear all registers therein and reconfigure the device. This is done for the reason that the LCD controller 102 has no memory associated therewith.

Figure 2:
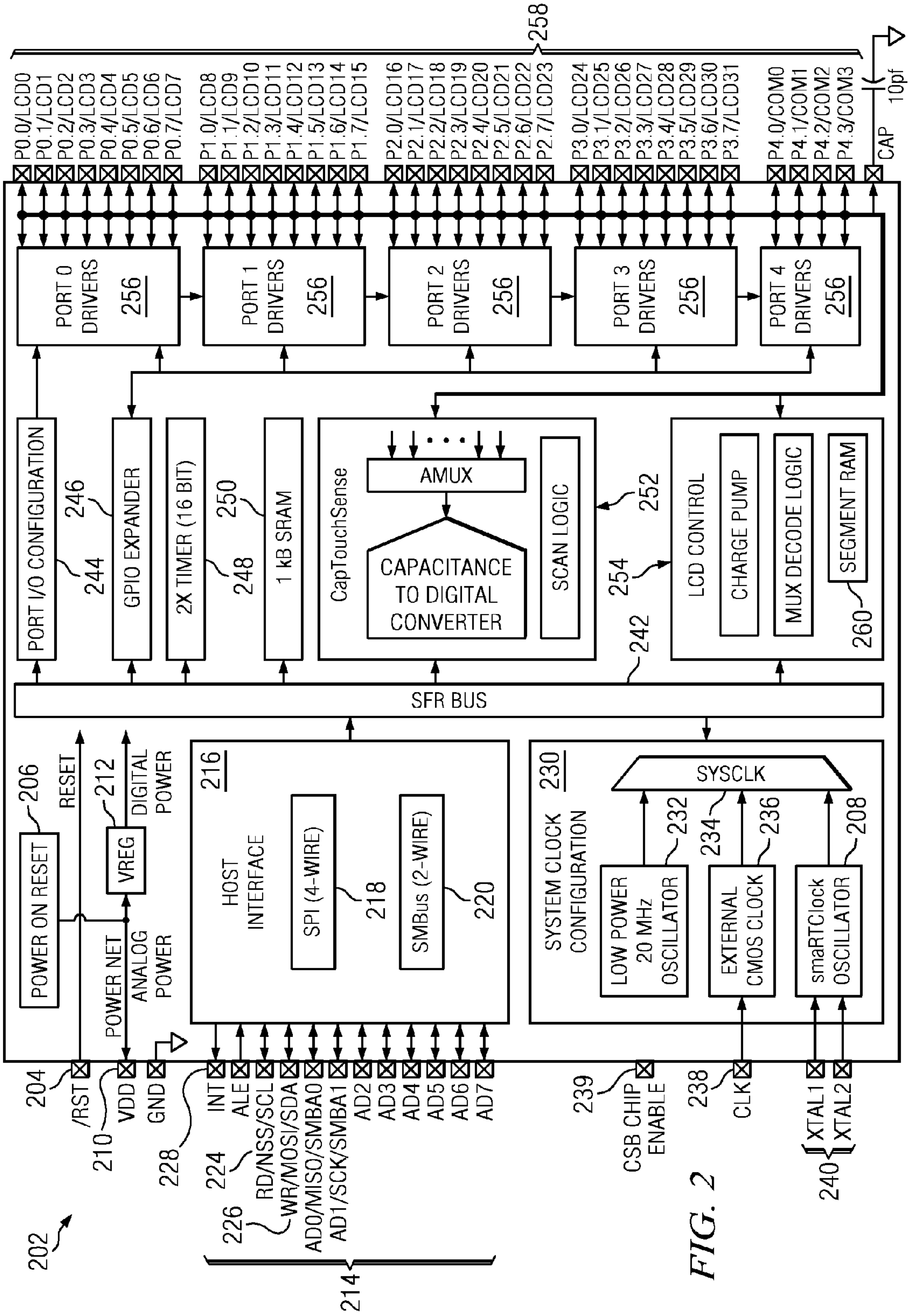
FIG. 2 is a block diagram of an LCD controller.

Referring now to FIG. 2, there is illustrated a block diagram of the LCD controller 202. The LCD controller 202 has two main reset sources. These include the RST PIN 204 and the power on reset block 206. The power on reset signal is generated by the power on reset block 206 tied to the Vdd pin 210 when the LDO (low dropout regulator) voltage regulator 212 turns on. In low power mode, when the LDO voltage regulator 212 is enabled, a power on reset signal is generated which will reset all of the logic except for the real time clock 208 and the LCD power control block (not shown). These blocks can only be reset via the RST PIN 204 when the LCD low power enable bit is turned off. After this, the real time clock 208 can be reset via either source, although the LCD low power block can still only be reset via the RST PIN 204. System power is provided via a $V_{DD}$ pin 210 to a LDO voltage regulator 212. The system power applied to $V_{DD}$ pin 210 is used to provide external power to the system through an associated power net, and the voltage regulator 212 provides regulated voltage to provide regulated power throughout the LCD controller 202. The power at $V_{DD}$ pin 210 is the raw unregulated power that is used to power the analog circuitry and provide power in low power mode. Basically, this is considered to be $V_{BAT}$ for the battery voltage. Note that the regulated power can be disabled in low power mode.

The LCD controller 202 is a slave to an external MCU through a plurality of interface pins 214 connected with the host interface 216. The host interface 216 supports a four wire SPI interface 218 and a two wire SMBus interface 220, all in a slave mode of operation only. The bus type supported by the host interface 216 is selected via the RST pin 204. A default mode for the LCD controller 202 is the SPI mode, providing for a serial data communication mode of operation. If, while the part is in reset, the RD pin 224 is held high or low while the WR pin 226 is held low, the controller 202 will power up in the SPI mode controlled by SPI interface 218. Finally, if while the LCD controller 202 is held in reset, the WR pin 226 is held high while the RD pin 224 is held low, the controller 202 will power up in the SMbus mode controlled by the SMBus interface 220.

The INT (interrupt) pin 228 is used to indicate the interface mode upon leaving reset mode. Upon exiting the reset mode, the INT pin 228 will toggle with the frequency of the system clock divided by eight to indicate that the SPI mode has been selected, and the interrupt pin 228 will be toggled with the frequency of the system clock divided by thirty-two to indicate the SMBus mode selection. This toggling will go on for two hundred fifty six system clock cycles, after which the INT pin 228 will revert to functioning as the interrupt pin.

As noted herein above, each of the LCD controllers 202 is addressable. By enabling the particular chip, the data and address information can be sent thereto such that data can be written to a specifically addressed SFR (Special Function Register) or read therefrom. As noted herein above, each LCD controller 202 is substantially identical such that the address space for each SFR is the same for each LCD controller 202. As such, there must be some way to distinguish between LCD controllers 202. With respect to the serial data bus protocols, the chip enable pin is not required, as each of these two protocols has the ability to address a specific chip. Again, this is part of the protocol. Thus, all that is required to address a particular chip and write data thereto or read data therefrom is a communication path and a particular data communication protocol and an appropriate way to select a particular chip. Further, each of these chips will have a separate interrupt pin that will allow an interrupt to be sent back to the MCU 104. There will, of course, have to be provided one interrupt line for each LCD controller 202 such that the particular LCD controller can be distinguished. What will happen then is that the MCU 104 will take the appropriate action, which will typically require the chip to be enabled and, after enabling, download the appropriate configuration information thereto, this assuming that the LCD controller 202 which generated the interrupt was in the low power mode of operation.

The system clock configuration block 230 enables the provision of a system clock signal from up to six clock sources. The low power 20 MHz oscillator 232 may provide a 20 MHz clock signal or alternatively may be divided by 2, 4 or 8 to provide a divided down 20 MHz clock signal to a multiplexer 234 for selection as the system clock. Additionally, external CMOS clock circuitry 236 may be used to provide the clock signal to the multiplexer 234 responsive to an external clock received via a clock pin 238. Finally, a real time clock oscillator (RTC) 208 may be used to provide a system clock signal to the multiplexer 234 for use in a power down mode of operation. The real time clock is configured via a pair of external pins 240.

The LCD controller 202 boots up running the 20 MHz oscillator 232 in a divide by 4 mode. The LCD controller 202 may then be configured to any of the other clock sources. The internal oscillator can be controlled, i.e., turned on and off, either using an internal control register while running off the CMOS clock or by using an external control mode while toggling a pin (in this case the CMOS_clock pin 238) to turn the internal oscillator on and off. The system clock configuration block 230 and associated clock circuitry therein are described in co-pending U.S. patent application Ser. No. 11/967,389 entitled "POWER SUPPLY VOLTAGE MONITORS" which is incorporated herein by reference in its entirety. The system clock configuration 230 with the control register includes a control register bit which may be used to enable a sleep mode of the system clock. When this register bit is set, the clock pin 238 may be used to enable and disable the internal low power oscillator 232 without removing power from the remainder of the controller circuitry. This would comprise a sleep mode wherein the circuitry of the controller 202 remains under system power, i.e., connected to $V_{BAT}$ or $V_{EXT}$ on $V_{DD}$ pin, but no clock signal is provided from the oscillator 232. The real time clock oscillator 208 is unable to be trimmed. The real time clock oscillator 208 requires a 32 KHz oscillator and runs on the $V_{BAT}$ voltage, external power. The RTC 208 provides the LCD clock source for the LCD controller 202 both in high and low power modes since it is powered from external power and will not lose power when the LDO voltage regulator 212 is powered down. The RTC 208 may be reset by the RST pin 204 only when in low power mode. When in high power mode, the RTC 208 may be reset by either the reset pin 204 or the power on reset 206 connected to the Vdd pin.

The CSB chip enable pin 239 enables the controller 202 to be operated in two different modes. When a particular bit within an associated SFR register is set, the CSB chip enable pin 239 may be used to enable and disable the voltage regulator 212 within the controller 202 without removing power to the rest of the circuitry running on $V_{BAT}$ within the controller 202. In this mode of operation, a bit is set internally that will designate the chip select bit as being an enable/disable pin for the LDO. In this mode of operation, the MCU 104 can generate through a dedicated line to a particular LCD controller 202 a signal that will cause the system to go into a low power mode. In this mode, what will happen is that the LDO will be powered down. This will result in the loss of power to a large block of circuitry, including registers and such. However, there will be a certain portion of the circuitry, such as certain portions of the LCD drivers or capacitive scanning circuitry, that will be enabled. The RTC 208 will also remain powered since it is not driven from the output of the LDO voltage regulator 212. In this mode of operation there will be certain registers that draw little power, but can be powered from the external power which is not regulated and may vary quite a bit. This particular circuitry, of course, is fabricated from high voltage circuitry whereas the circuitry associated with the output of the LDO voltage regulator 212 can have a regulated voltage and can be fabricated from much lower power (lower voltage) circuitry with thinner oxides and the such. When the system is re-enabled, what will happen is the LDO will be powered up and then a power on reset generated. In this power on reset, what will happen is that certain registers will be cleared, as they may have an unknown state, and then the configuration information is downloaded from the MCU 104 over the communication bus 110 to the LCD controller 202. The reason that this is required is because no flash memory is contained on-chip within the LCD controller 202. If memory were provided, this would not be necessary. However, that results in a much more expensive part and a different fabrication process. Since the MCU 104 has flash memory, it is only necessary to download the information thereto. As noted herein above, one event that can cause the MCU 104 to re-enable the LCD controller 202 is the generation of an interrupt by the part. This interrupt indicates the presence of a touch on the capacitive sense array or the change of a value on a GPIO pin or any other pin with the port match feature. The re-enable is necessary in order to service the interrupt. However, during operation where the system is waiting for some change in the capacitive sense array or waiting for some change in data on a port, the part is placed in a low power mode of operation.

Components within the LCD controller 202 communicate via an SFR bus 242. The SFR bus 242 enables connections with a number of components including port I/O configuration circuitry 244, GPIO expander 246, timers 248, SRAM 250, capacitive touch sense circuitry 252 and the LCD control block 254. The port I/O configuration circuit 244 enables control of the port drivers 256 controlling a plurality of general purpose input/output (GPIO) pins 258 to configure the ports as digital I/O ports or analog ports. These GPIO pins 258 may be connected to a liquid crystal display controlled via the LCD control block 254, or alternatively, could be connected to a capacitive sensing array controlled via the capacitive touch sense circuitry 252. Further, they could be configured to be a digital input or output to allow the MCU 104 to expand its own internal GPIO capabilities.

The GPIO expander 246 offers a connection to 36 GPIO pins 258 for general purpose usage. The GPIO expander 246 allows the MCU 104, which itself has a plurality of pins which can be dedicated to digital input/output functions, to expand the number of pins available thereto. By addressing a particular LCD controller 202 and downloading information thereto while that LCD controller 202 is configured as a GPIO expander, data can be written to or read from any set of the GPIO pins on that LCD controller 202. This basically connects those pins through the port drivers to the SFR bus of the MCU 104.

The GPIO pins 258 can also be used for port match purposes. In the port match mode, each port can be treated as a match target with individual match selects for each pin. The port match process is a process wherein an internal register has a bit associated with a particular input/output pad. This pad will have associated therewith a digital I/O circuit which allows data to be received from an external pin or transmitted to an external pin. When configured as a digital I/O pin, this feature is enabled. However, each pin can also be configured to receive analog data or transmit analog data such that it is an analog pin. When so configured, the digital I/O circuitry is disabled or "tri-stated." The port match feature has digital comparator circuitry external to the pad provided which basically compares the current state of the associated pin with a known bit, this being a bit that is on the pin at the time of setting. Changing of the data indicates a change in the state which will generate an interrupt and will load information in a particular register such that this internal register or SFR can be downloaded and scanned to determine which port incurred a change. Of course, the MCU 104 also can just read the port pin itself. What this allows is one pin to be "toggled" to allow a signal to be sent external to the chip (LCD controller 202) to the MCU 104 indicating that new data has arrived. This is a way of clocking data through.

If an ultra low power port match mechanism is desired, the LCD controller 202 can be switched into ultra low power mode and the same register used to save port match values. In this mode, the port match is forced to either match on all negative going signals or all positive going signals based on a bit in a configuration register. A port match will cause the generation of an interrupt via interrupt pin 228 which will cause the master controller MCU 104 to have to turn on the LDO voltage regulator 212 by pulling the CSB chip enable pin 239 low and, after detecting an interrupt, begin communicating with the LCD controller 202.

The timers 248 comprise generic 16-bit timers. Upon overflowing, the timers 248 will generate an interrupt via interrupt pin 228 to the master controller. The timer circuit 248 comprises two 16-bit general purpose timers. One timer is normally used for the SMBus time-out detection within the controller 202. The other timer is used as the capacitive sense time-out timer for the capacitive touch sense circuitry 252. The 1 kB SRAM 250 is offered for general purpose usage and can be read from and written to via any of the three host interfaces 216. The SRAM 250 can be unpowered if desired via a configuration bit. Thus, in applications that do not require extra SRAM, power can be saved by powering down the SRAM. Note that this SRAM 250 will lose its contents when the LDO is shut off.

The capacitive touch circuitry 252 implements a capacitive touch sense capability up to a maximum of 128 possible sensing locations. This large number of touch sense pins is supported via an array sensing capability. The capacitive touch sense circuitry 252 includes three operating modes: the linear auto scan mode, the row/column auto scan mode and the 4×4 scan with LCD mode. Each capacitive pin detection takes approximately 32 microseconds. Thus, sensing 128 possible touch sense locations will take approximately 4.6 milliseconds which is well within any human interface appliance timing requirements. As noted herein above, whenever the system is configured for scanning, the system can operate in a low power mode or in a high power mode. In a low power mode, the system basically waits for some indication that a particular pad has been touched and then generates an interrupt. As will be described herein below, this basically utilizes the analog aspect of each of the pads, i.e., the analog value on each of the pads is sensed.

The LCD control block 254 of the LCD controller 202 can operate in static, 2×, 3× or 4× multiplexed modes. The LCD control block 254 can drive a maximum of 128 LCD segments in 4× multiplex mode or 96 segments in 3× multiplex mode and 64 segments in 2× multiplex mode. In static mode, the LCD control block 254 will drive 32 segments. The LCD control block 254 also supports a blinking mode where individual segments can be blinked on and off. The LCD also supports a contrast selection setting capability supporting 16 different contrast levels. A maximum of 32 LCD segment pins and four common mode pins are defined.

The LCD control block 254 also supports an ultra low power (ULP) static mode capability wherein the controller 202 will keep an LCD display illuminated while driven off the $V_{BAT}$ supply and not use the charge pump or low dropout regulator. This is done by driving the LCD pad outputs directly via toggling the set and reset pins on the pad level shifters based on the data in a segment RAM 260. In the ultra low power mode of operation, the LCD controller 202 may be operated in static LCD mode to keep an LCD perpetually illuminated with repeating data. The data to be displayed on the LCD is written to four data registers independent of the normal LCD data registers. The rest of the part is shut down, leaving the RTC and LCD running entirely off the $V_{BAT}$ supply. If it is deemed necessary to change the data in the LCD data registers, the CSB chip enable pin 239 will have to be pulled low which will enable the LDO voltage regulator 212 and generate a power on reset to the chip after which communication can begin with the master and the LCD controller 202. Note that the bus type selection is latched in the logic running off the $V_{BAT}$ domain. Thus, when returning from the ULP mode it is not necessary to go through bus selection signaling again. The reset pin, if toggled at this time, will reset the LCD as well as the rest of the chip, thus requiring bus selection signaling once again. Note that since this mode toggles, the digital outputs of the pads in this mode could also be used to generate any sort of low speed digital wave form on any of the GPIO pins 258.

In operation, the multiplexers associated with the analog voltage multiplexer 408 and the output control signals are actually provided in the I/O pad. In the I/O pad, there is provided a multiplexer which has four inputs associated therewith and a single output connected to the pin when the pin is configured for the analog mode at that port. Each of the multiplexers associated with each of the pads has a control signal associated therewith. This control signal is comprised of four lines, one for selecting each of the voltages in the multiplexer. Therefore, there will be a common four-line bus that will route the four lines for the four voltages to each of the multiplexers for each of the pads. There will then be four control lines dedicated to each multiplexer such that, for 38 pins, there will be 38×4 control lines that will control the multiplexers such that each multiplexer is individually controllable. Therefore, the multiplexing operation is transferred to the pads as opposed to being in a central circuit.

In ULP port match mode the part can be shut down completely, except for the RTC and LCD_LP blocks, except that when a port match is detected the interrupt pin is toggled, thus waking up the host controller which can then resume communications with the LCD controller based upon the preserved bus type selection. Note that the port match function in the higher power mode allows skipping of these steps since the machine states will be preserved unlike the ULP port match function.

Figure 3:
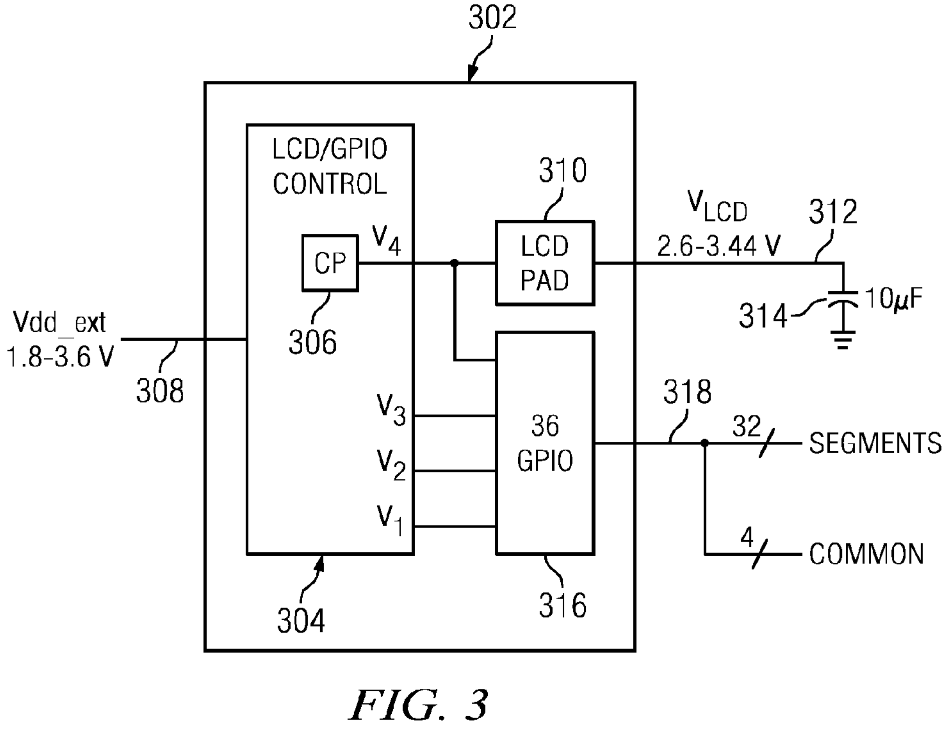
FIG. 3 is a block diagram of the control circuitry for the LCD/GPIO pins of the LCD controller.

Referring now to FIG. 3, there is illustrated a block diagram of the control circuitry for the LCD/GPIO output pins of the LCD controller 302. The LCD controller includes an LCD/GPIO control block 304 which provides four different output voltages V1, V2, V3 and V4. The voltages V1 through V3 are provided from the LCD/GPIO control block 304. The voltage V4 is provided from a charge pump block 306 within the LCD/GPIO control block 304. Each of these voltages V1 through V4 are provided responsive to a provided external voltage $V_{DDEXT}$ which may be between 1.8 volts and 3.6 volts. The external voltage is provided to the LCD/GPIO control block 304 via an external pin 308. The voltage V4 is provided from the LCD pad 310 associated with an LCD pin 312. The LCD pin 312 provides a voltage to an associated LCD represented by the capacitor 314. Each of the voltages V1 through V4 are also provided to the GPIO pad logic 316 associated with the 36 GPIO pins 318. The GPIO pins 318 are connected to provide 32 segment control signals to associated LCDs and four common control signals in order to provide the controls to the connected LCDs in both static and multiplexed modes of operation.

Figure 4:
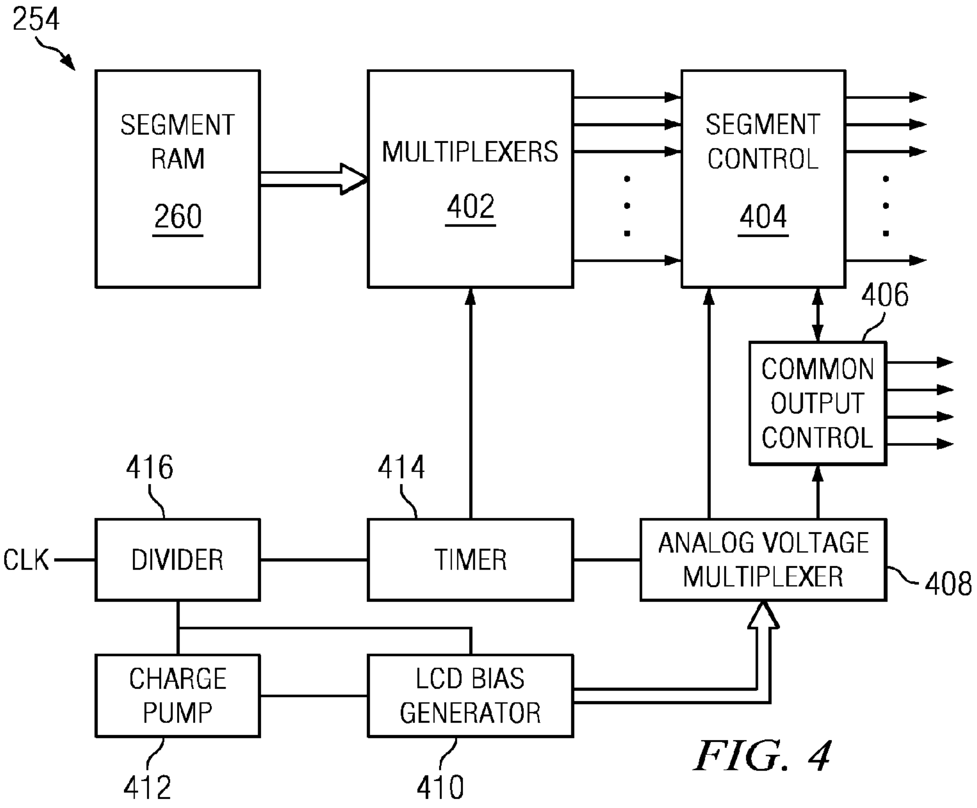
FIG. 4 is a functional block diagram of the LCD control block 254.

Referring now to FIG. 4, there is provided a functional block diagram of the LCD control block 254. The LCD control block 254 contains the components necessary for driving various segments of an attached liquid crystal display that is attached to the various I/O pins 258 (FIG. 2). Segment RAM 260 includes the information necessary for controlling segments within attached liquid crystal displays to display information in a desired manner. The segment RAM 260 includes storage locations each associated with a particular LCD segment. In order to turn on an LCD segment, a memory bit within the segment RAM 260 is set.

The multiplexers 402 enable the LCD controller 202 to operate in either the static, 2×, 3×, or 4× multiplexed modes. The segment control block 404 provides the LCD controller with the ability to drive a maximum of 128 LCD segments in the 4× multiplexed mode, 96 LCD segments in the 3× multiplexed mode, and 64 LCD segments in the 2× multiplexed mode. Within the static mode, the segment control block 404 may control 32 LCD segments. The common output control block 406 provides four common mode pin outputs for providing control during 2×, 3× and 4× multiplexed modes.

The analog voltage multiplexer 408 provides the various voltages to the segment control block 404 and the common output control block 406 necessary for providing the voltages to activate or deactivate particular LCD segments. The bias voltages used by the analog voltage multiplexer 408 for driving the various crystal segments are generated within the LCD bias generator 410. A charge pump 412 provides the necessary voltages to the LCD bias generator 410 for generating the segment driving voltages. Timer circuitry 414 controls the timing of the LCD control block 254. Finally, a divider circuit 416 may be used to generate various clock signals for controlling the operation of the timer circuitry 414 and the operation of the charge pump 412 and LCD bias generator 410 responsive to an externally provided clock.

Figure 5A:
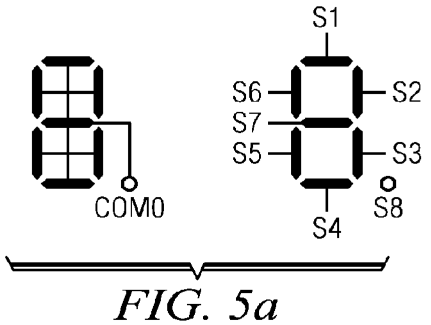
FIGS. 5*a*-5*d* illustrate various manners for interconnecting segment pins and COM pins of an LCD display.

Referring now to FIGS. 5*a*-5*d*, there are illustrated the various manners for interconnecting the segment pins and the COM pins to associated LCD segments in order to control their operation. FIG. 5*a* illustrates an example of the connection of the pins for a static LCD mode of operation. In the static mode of operation, segment control signals consisting of signals SP1 through SP8 each control one segment of the LCD display. A single COM signal is then associated with each of the LCD segments and may be used for turning on and off all of the segments as desired.

Figure 5B:
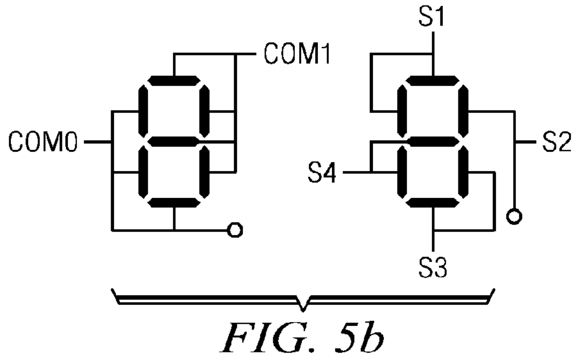

In the 2-MUX mode of operation, illustrated in FIG. 5*b*, each segment pin is associated with two separate segments of an LCD display. Thus, an entire LCD display has four segment pins. Each LCD display also has associated therewith two COM pins, COM0 and COM1. Each of the COM pins are associated with four of the eight LCD segments. The segment pin controls and COM pin controls are configured within the 2-MUX mode of operation such that the two segments associated with each segment pin are each associated with a different COM pin. Thus, when a control signal indicating to activate a segment pin is received, the segment will only be actuated when it has also received an active indication from the COM pin associated with the segments.

Figure 5C:
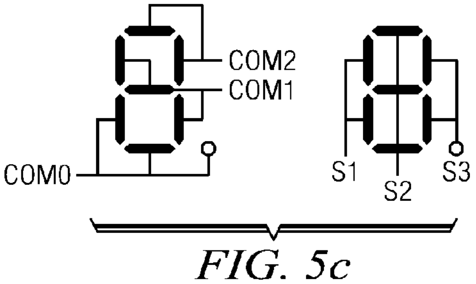

Referring now to FIG. 5*c*, there is illustrated the 3-MUX mode of operation. In the 3-MUX mode of operation, each segment pin has two or three segments associated therewith. The SP1 segment pin is associated only with two segments while each of the SP2 and SP3 segment pins are associated with 3 segments. The LCD display segments are each associated with one of three common lines, COM0, COM1 and COM2. The segment pins and COM lines are associated with the segments of the LCD display such that in order to actuate a particular segment of the LCD display, both the segment pin and the COM pin associated with the particular segment must provide an indication of the segment being turned on in order for the segment to be actuated.

Figure 5D:
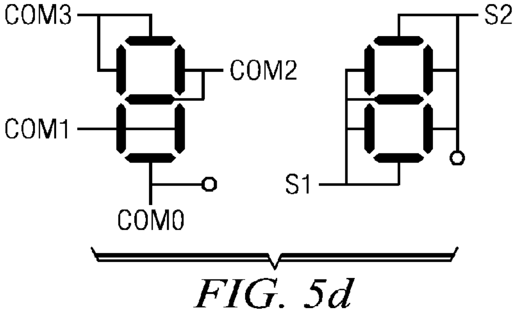

Finally, referring now to FIG. 5*d*, there is illustrated the connections of the LCD display segments for the 4-MUX mode of operation. In the 4-MUX mode of operation, each segment pin is associated with four separate LCD segments such that each LCD display only has two LCD pins, SP1 and SP2 associated therewith. Each LCD display also has four COM pins associated therewith with two of the segments associated with each of the COM pins. Again, as with respect to the other modes of operation, in order for a segment to be lit within the LCD display, each of the segment pin and COM pin associated with the segment must provide an active indication.

Figure 6A:
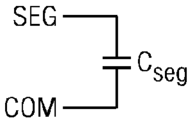
FIG. 6*a* illustrates the general manner for applying control signals to an LCD capacitor segment.
Figure 6B:
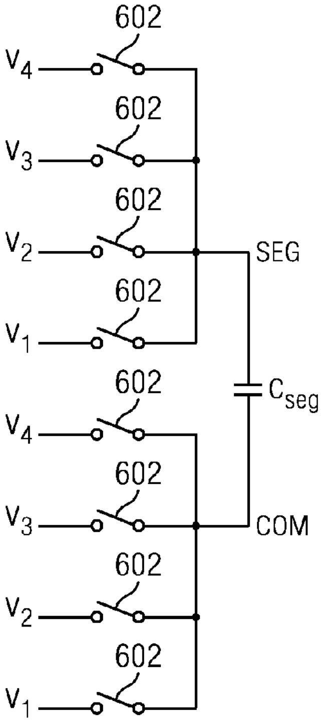
FIG. 6*b* illustrates the manner for applying voltages V1 through V4 for driving an LCD segment via segment control signals and COM control signals.

The voltages V1 through V4 are applied to the various segments associated with a particular segment of an LCD display. FIG. 6*a* illustrates the general manner in which the control signals are applied. The capacitor $C_{SEG}$ represents a segment of the LCD display. A top plate of the capacitor $C_{SEG}$ is connected to receive the segment pin control signal while the lower plate of $C_{SEG}$ is connected to receive the COM line signal. Each of these signals from the SEG pin and COM line are used to charge the capacitor to either illuminate or not illuminate the associated segment. Referring now also to FIG. 6*b*, there is illustrated the manner in which the various voltages V1 through V4 that are provided by the LCD control block 304 (FIG. 3) may be provided as the segment control signal and the COM control signals to the segment of an LCD display represented by the capacitor $C_{SEG}$. Each of the voltages V1, V2, V3 and V4 are associated with each segment node of the capacitor $C_{SEG}$ and the COM node of the segment capacitor $C_{SEG}$. An associated switch 602 may be actuated in order to connect a selected voltage to the LCD segment $C_{SEG}$ by closing the associated switch to provide desired voltage on either the segment node or the COM node of the capacitor $C_{SEG}$. Appropriate combination of voltages may be selected in order to illuminate the segment represented by the capacitor $C_{SEG}$ within the LCD display. The switching frequency of the switches 602 associated with the segment controls the level of the voltage provided at the LCD segment represented by the capacitor $C_{SEG}$.

Figure 7:
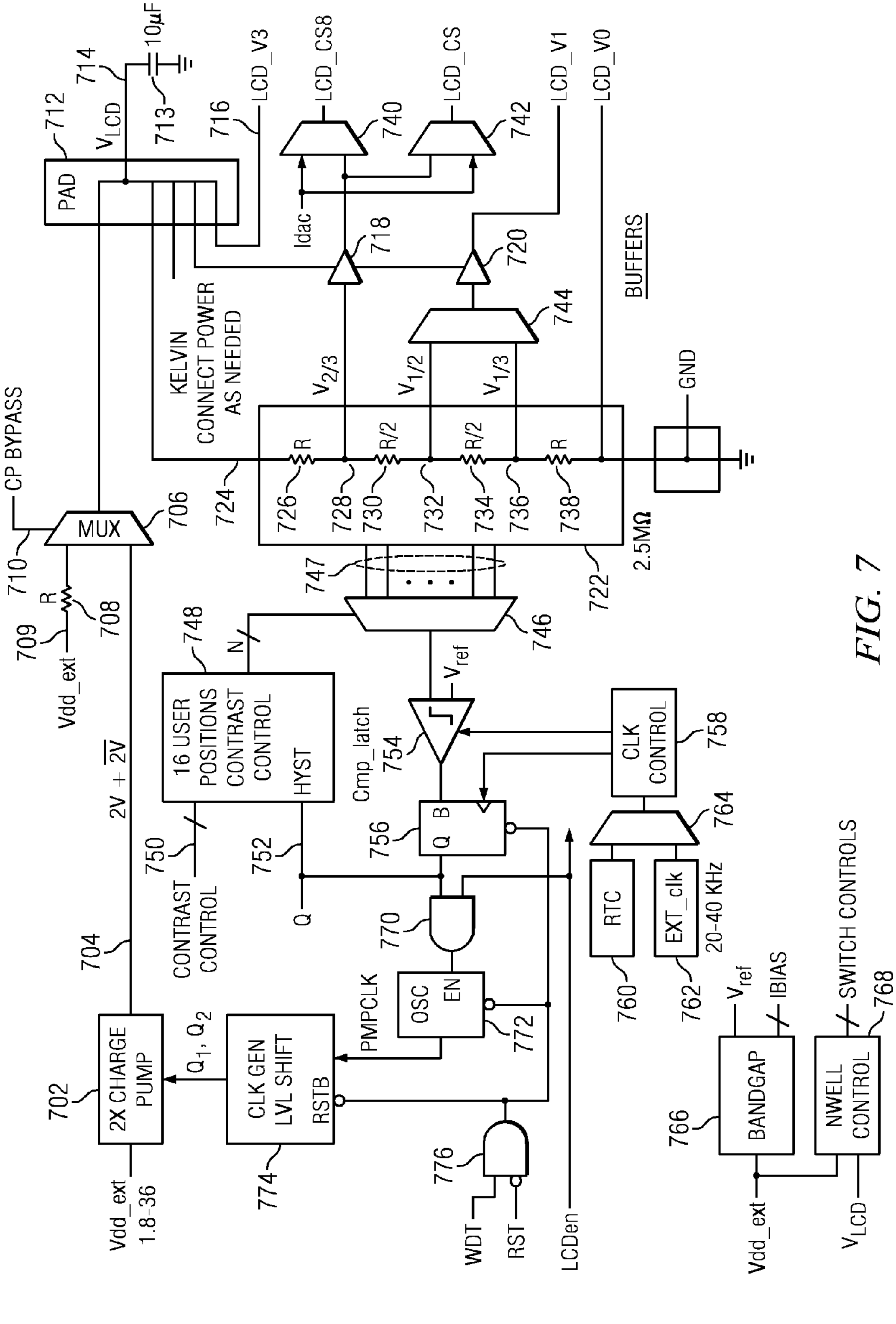
FIG. 7 provides a more detailed illustration of the LCD controller circuitry.

Referring now to FIG. 7, there is provided a more detailed illustration of the LCD controller circuitry. The external voltage $V_{DDEXT}$ consisting of a 1.8 volt-3.6 volt signal is input to a 2× charge pump 702. The 2× charge pump 702 responsive to the provided external voltage generates up to twice the provided input voltage and outputs the voltage on line 704 to a multiplexer 706. The multiplexer 706 receives the voltage from the 2× charge pump 702 and can also receive an external voltage $V_{DDEXT}$ through a resistor 708. The multiplexer, in one mode of operation, selects between the $V_{DDEXT}$ signal and the voltage signal from the 2× charge pump 702 responsive to a CP bypass signal provided via control input 710 from an associated MCU. The CP bypass signal selects the voltage applied to the pad 712 based upon the selection mode by the MCU. The pad 712 provides the voltage from the multiplexer 706 as the voltage $V_{LCD}$ which is output via pin 714, pin 714 having an external capacitor 713 disposed thereon to ground. The voltage $V_{LCD}$ from the multiplexer 706 is also provided as an LCD drive voltage LCD_V3 at node 716 and as an input signal to a pair of buffers 718 and 720.

Using the multiplexer 706, a bypass mode of operation may be implemented using a bypass control provided on control input 710. In the bypass mode of operation, an external voltage $V_{DDEXT}$ is provided directly to the output pad 712 through resistor 708 and a switch 709. In the bypass mode of operation this provides the voltage for the output pad from the input through resistor 708 rather than utilizing the charge pump 702 and associated circuitry within the control loop. By controlling the switching frequency of the switch 709 the voltage provided to the output pad LCD drive logic may be altered. Use of a larger switching frequency will increase the apparent voltage applied at the output pad logic for a given load condition. The switching frequency effectively changes the apparent load of the resistor 708 into Vdd_ext Similarly, a lower switching frequency will lower the provided voltage. This separate manner of control may be provided if it is determined that the actual external voltage is higher than what would be required by the charge pump. For example, if a voltage level of approximately 3.0 volts were required or desired for the operation of the LCD array and the input voltage were in the range of 2.0 volts, the charge pump will be required to combine the 2× pumping operation. However, if the external voltage were already at 3.0 volts or higher, it would not be necessary to activate the charge pump operation, as the charge pump is essentially a switched capacitor operation that would essentially provide a series switched capacitor resistor with a value of (1/C)f in series with the output. Thus, if the external voltage were 4.0 volts, for example, the charge pump would provide a maximum voltage of 8.0 volts which would be regulated by the loop control described herein. By providing an external resistor 708 that can be switched with the switch 709, an external voltage of 4.0 volts can be switched under control of the AND gate output 770 and connect the voltage $V_{DDEXT}$ to the resistor 708. This would basically provide the charging input to the capacitor 713 through the pad 712. It is noted that the reason for providing this ability to switch in the external voltage (when it is at an appropriately high value) directly to the pad 712 is to not utilize the charge pump 702, since the charge pump 702 can be inefficient and be a source of power consumption, which in low power devices is to be avoided.

The voltage $V_{LCD}$ from the multiplexer 706 is also provided to a resistor string 722 that is used for generating the various voltages that are applied as LCD drive voltages to the segments of the LCD display. The resistor string 722 is connected between node 724 within the pad 712 and ground. The resistor string 722 consists of a first resistor 726 connected between node 724 and node 728. A second resistor 730 connected between nodes 728 and 732 is half the value of the resistor 726. A third resistor 734 having the same value as resistor 730 is connected between node 732 and node 736. A resistor 738 having the same value as resistor 726 is connected between node 736 and the ground node.

The voltage provided from node 728 comprises two thirds of the $V_{LCD}$ voltage. The voltage provided from node 732 comprises one-half the voltage $V_{LCD}$. The voltage provided from node 736 comprises one-third the $V_{LCD}$ voltage, and the voltage from the ground node is "0" volts. Each of these voltages from the resistor string are provided as various output voltages for providing control signals for the segment and COM signals. The voltage V 2/3 from node 728 is provided through a buffer 718. The output of the buffer 718 is connected to one input each of a pair of multiplexers 740 and 742. Each of the multiplexers 740 and 742 include two inputs. The first input receives the buffered V 2/3 voltage from the resistor string 722 and the other input is connected to receive the control signal $I_{DAC}$. The output of multiplexer 740 comprises either the $I_{DAC}$ output or the V2/3 output and is labeled LCD-C58. The output from multiplexer 742 comprises either the $I_{DAC}$ output or the V2/3 output and is labeled LCD-CS. A further multiplexer 744 is connected to receive the V 1/2 output from node 732 and the V 1/3 output from node 736. The output of the multiplexer 744 is provided to a buffer 720. The buffered output from buffer 720 of the voltage signal selected by multiplexer 744 is provided as the output voltage signal LCD_V1. The output voltage of the ground node is referred to as LCD_V0.

The resistor string 722 comprises a variable resistor string which may be tapped at any location along its length by an input of a multiplexer 746 which has a plurality of selectable inputs 747, each connected to a predetermined position along resistor string 722. The output of the multiplexer 746 is used for adjusting contrast control from the output of the resistor string 722 and selects one of sixteen signals from inputs 747 responsive to a control input from contrast control block 748. The output of the contrast control block 748 enables the multiplexer 746 to select one of the inputs 747 to the multiplexer 746 that is connected to the resistor string 722 at a desired input point. The contrast control block 748 selects the appropriate contrast input responsive to a contrast control signal provided via input 750 and hysteresis control input received from node 752. This contrast control essentially allows control of $V_{LCD}$ in discrete steps.

The output of the multiplexer 746 is provided to a first input of a comparator/latch 754. The other input of the comparator/latch 754 is connected to a reference voltage $V_{REF}$. The output of the comparator/latch 754 is connected to a D-input of a flip-flop 756. Both the comparator/latch 754 and the flip-flop 756 receive a clock input from a clock control block 758. The clock control block 758 receives a clock signal from either an internal real time clock 760 or an external clock 762, one of which is selected via a multiplexer 764, this being a low frequency clock signal around 32 MHz. The reference voltage $V_{REF}$ provided to the comparator/latch 754 is provided from a bandgap circuit 766 such that it is a stable and known voltage. The bandgap circuit 766 provides the $V_{REF}$ voltage and various bias voltage outputs responsive to a $V_{DDEXT}$ signal. The n-well control block 768 provides various switching control signals responsive to the $V_{DDEXT}$ signal and the $V_{LCD}$ drive voltage.

The Q-output of flip-flop 756 is provided to a first input of AND gate 770. The other input of AND gate 770 is connected to receive the LCD enable control signal (LCDEN) to enable/disable the LCD. The output of the AND gate 770 enables the oscillator 772. The oscillator 772 provides a clock signal PMPCLK to the clock generation and level shift logic 774 that generates signals to enable the operation of the charge pump 702. Each of the clock generation and level shift logic 774, oscillator 772 and flip-flop 756 are reset responsive to a reset signal provided to an AND gate 776. The AND gate 776 is connected to receive a WDT signal (watch dog timer) on a first non inverted input and a reset signal on an inverted input to either reset the system when some unknown state has caused a failure, or in response to an external reset signal.

The circuit of FIG. 7 includes an LCD oscillator control loop that enables the oscillator 772 controlling operation of the charge pump 702 to be periodically disabled when the output voltage $V_{LCD}$ being provided from the charge pump is already within a desired range. The control loop consists of the resistor string 722 and multiplexer 746, the comparator/latch 754, the flip-flop 756 and the AND gate 770. These provide a feedback to the oscillator 772 and clock generation and level shift logic 774 which controls operation of the charge pump 702. A comparator/latch 754 compares an output voltage from a selected contrast control location on a resistor string 722 with a desired voltage level $V_{REF}$ provided by the bandgap circuit 766.

Figure 8:
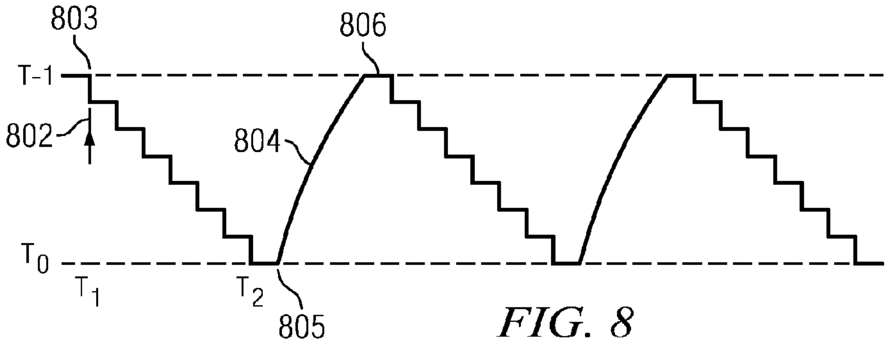
FIG. 8 illustrates the waveform $V_{LCD}$ generated using the LCD control feedback loop.

Referring now to FIG. 8, there is illustrated a diagram of the operation of the comparator/latch 754 and the loop control provided to the charge pump 702. The desired average voltage level is defined as $T_0$ which represents a tap voltage from the resistor string 722 when the voltage level is falling that, when input to the comparator/latch 754, will equal the value of $V_{REF}$. For example, if $V_{REF}$ were equal to 1.0 volts and the desired voltage for the voltage on the output node 716 (the voltage on node 724) were 2.0 volts, this would mean that the resistor string 722 would be tapped at ½ of its value such that the tap voltage were 1.0 volts. With such an operation, the output of multiplexer 746 would be equal to 1.0 volts when the output voltage of the charge pump 702 were equal to 2.0 volts. When the voltage at the input of comparator/latch 754 rises above $V_{REF}$, i.e., above 1.0 volts, then the output of comparator/latch 754 would indicate that the loop should be disabled and, when the output of multiplexer 746 goes below 1.0 volts, the comparator/latch 754 would indicate that the control loop should be enabled to then increase the voltage on the output of charge pump 702 to charge capacitor 713.

However, without hysteresis there could be instabilities. Thus, hysteresis is provided in the form of selecting different taps. The taps are disposed at discrete positions along the resistor string about a desired voltage. The voltage is defined at tap $T_0$ when the LCD output voltage is falling from a high level T−1 to a low level $T_0$. Similarly, the voltage is defined at tap T−1 when the LCD output level is rising fro a low level of $T_0$ to a high level of T−1. In operation, when the control loop is enabled, the contrast control block 748 selects the $T_0$ tap when the charge pump 702 is disabled when the voltage level reaches the T−1 voltage level, as indicated at a time $T_1$ at a point 802 on the timing diagram. When the voltage of the output of the charge pump 702 exceeds the desired voltage $T_0$ by the one discrete step (ratioed by the resistor string 722), the voltage output by the multiplexer 746 will exceed the desired voltage. This would cause the output of the comparator 754 to go to a logical high level and disable the charge pump oscillator 772.

Once the comparator 754 trips, the charge pump 702 is disabled and the charge is stored on the external capacitor 713. The new tap representing the $T_0$ voltage level is selected by multiplexer 746 responsive to input from the contrast control block 748. What will happen then is that there will be an update rate for the LCD display. This is illustrated by the various steps of discharge that the output voltage on node 716, for example, will traverse. For each update, there will be a discharge of a packet of charge from the capacitor 713. This will continue until the voltage has fallen below the $T_0$ voltage, it being noted that at trip voltage at T−1, at a point 803, the block 748 controls the multiplexer 746 to select the $T_0$ tap, this being the point at which the oscillator was disabled. At that point, there is no charge being input to the external capacitor 713 and, absent any discharge therefrom, this voltage would remain at substantially that level. However, the output of the resistor string is utilized to control an LCD array which is updated on a periodic basis, as described herein above. This periodic update results in a stepped discharge of capacitor 713 from time $T_1$ to a time $T_2$. The voltage on the node 724 at the top of the resistor string 724 will fall until the tapped voltage input to the multiplexer 746 causes the voltage on the input of the comparator/latch 754 to fall below $V_{REF}$, at which time the comparator 754 will be triggered to a low logic state to thus provide on the output of the flip-flop 756 a logic “0” which will cause the contrast control block 748 to select the T−1 tap which will basically select a lower voltage tap on the resistor and to enable the charge pump 702. Since the charge pump 702 is enabled and the block 748 will select the T−1 tap, this being at point 805. As the charge pump 702 charges the capacitor 713, the voltage will increase to a point where the voltage exceeds the voltage on tap T−1, at point 806. The voltage on the tap will rise above $V_{REF}$, thus placing a logical “high” on the output of the comparator/latch 754 and causing the Q-output of the flip-flop to go high when the update clock occurs, thus, causing the $T_0$ tap to be selected. This will then repeat the charge process.

Thus, it can be seen that the charge pump 702 is enabled only during times that it is required to charge the capacitor 713 and it is not required for the charge pump 702 to be continuously operated. In addition, as will be described herein below, the overall loop operation is that the comparator/latch 754 need only provide a comparison operation during the update time period and, after that period, is only required that the output be latched. The update period defined by the clock control block 758 will activate the comparator latch during that time, provide the comparison and latch the logic state on the output thereof for input to the flip-flop 756. The output of the flip-flop 756 then controls the AND gate 770 to enable the oscillator 772. This will then provide an oscillator to the charge pump 702 as described herein above.

Figure 9:
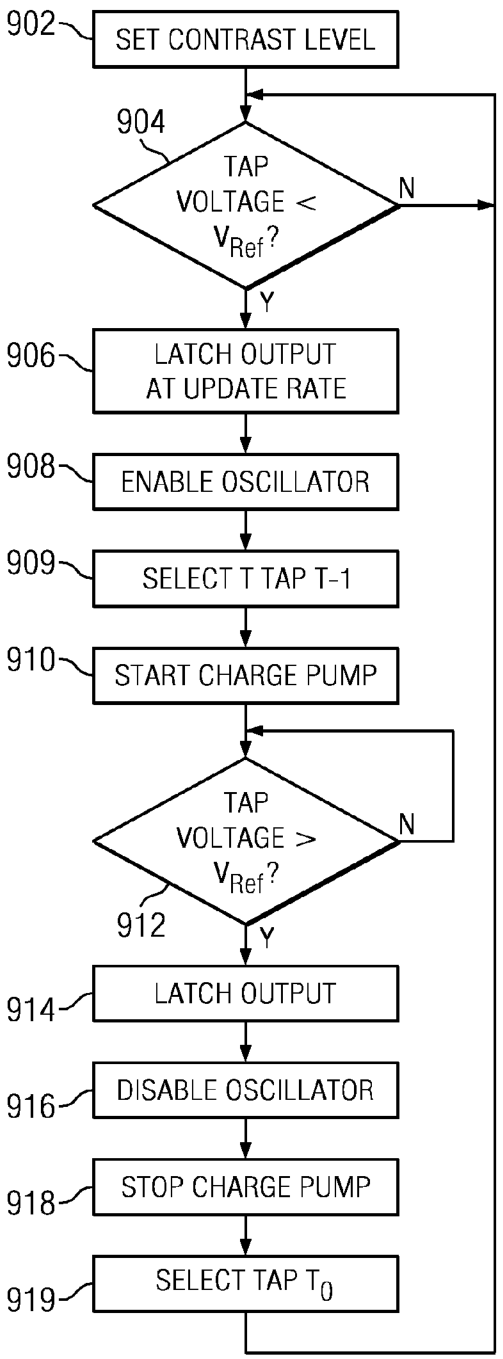
FIG. 9 is a flow diagram illustrating the operation of the LCD control loop.

Referring now to FIG. 9, there is illustrated a flow diagram describing the operation of the above described control loop. Initially, the contrast level is established using the contrast control block 748 to select a particular input of the multiplexer 746 to connect to the resistor string 722 to provide a desired voltage level. The voltage provided at the selected contrast level $V_{LCD}$ provided from multiplexer 746 is compared with the reference voltage $V_{REF}$ at inquiry step 904 by the comparator/latch 754. If inquiry step 904 determines that the voltage on the selected tap does not fall below the reference voltage $V_{REF}$, inquiry step 904 continues the comparison process. Once the voltage on the selected tap falls below the reference voltage, the output of the comparator/latch 754 is latched therein at step 906 to the output of the comparator/latch 754. This occurs at the update rate of the clock control block 758. The latched output is then clocked through the flip-flop 756 to enable the oscillator 772 at step 908 and selects tap T−1 at step 909. The clock signal provided by the oscillator 772 starts operation of the charge pump 702 at step 910.

Once the charge pump begins increasing the LCD voltage, inquiry step 912 begins comparing_at the update rate of control block 758, at step 912, the voltage on the selected tap with the reference voltage to determine if the voltage on the selected tap exceeds the reference voltage. If not, inquiry step 912 continues the comparison process. Once inquiry step 912 determines that the voltage on the selected tap exceeds the reference voltage, the output of the comparator is latched at step 914. The latched output causes the oscillator 772 to be disabled at step 916 which causes the operation of the charge pump 702 to stop at step 918 and select tap $T_0$ at step 919. Control then passes back to step 904, and the loop control process repeats. Using the above described method, the LCD voltage ($V_{LCD}$) voltage may be maintained within a desired range while the oscillator 772 may be disabled to save system power at certain points when the voltage resides within the desired range.

Figure 10A:
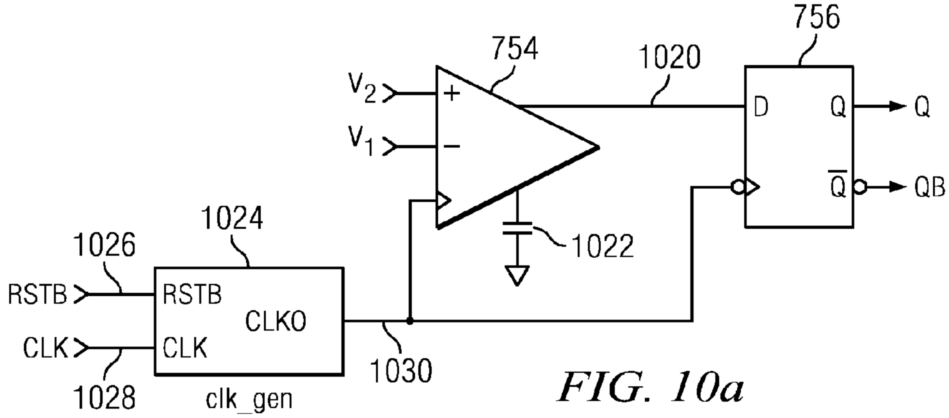
FIG. 10*a* is a simplified block diagram of the comparator circuit illustrating the dynamic latch aspects thereof.
Figure 11A:
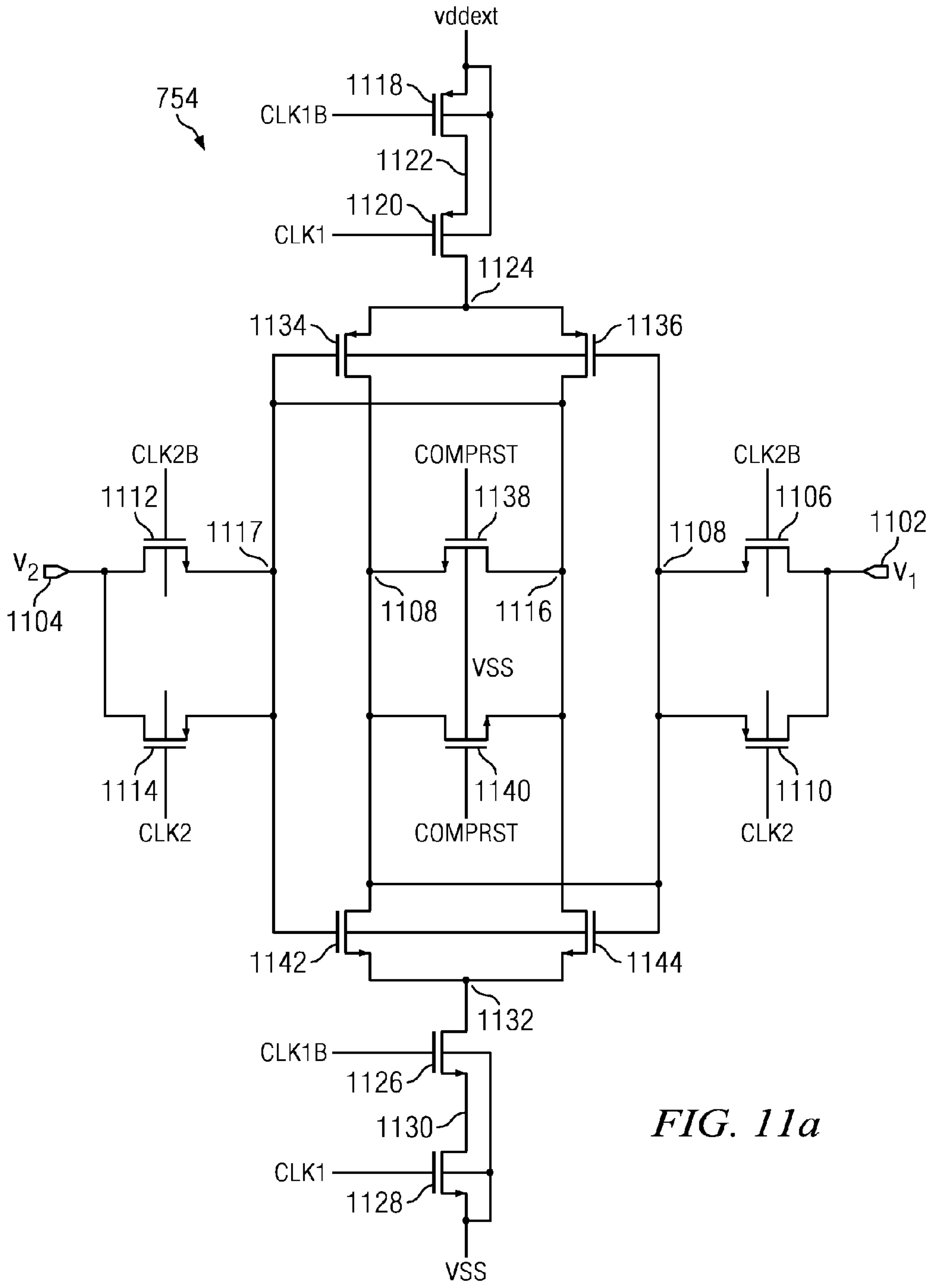
FIG. 11*a* is a schematic diagram of the dynamic comparator.

Referring now to FIGS. 10*a* and *b* and FIGS. 11*a, b* and *c*, there are provided more detailed illustrations of the comparator/latch 754. As described previously, the comparator/latch 754 comprises a clocked comparator latch whose positive output feeds to the D-input of flip-flop 756. The negative output of the comparator/latch 754 is loaded with a capacitor to ground to match the input stage of the flip-flop 756. Referring now more particularly to FIG. 10*a*, there is illustrated a block diagram of the comparator/latch 754 and flip-flop 256. The V1 input comprises the inverting input of the comparator/latch 754 and is the input to which the reference voltage $V_{REF}$ is applied. The input node V2 comprises the non-inverting input of the comparator/latch 754 and comprises the node to which the voltage on the selected taps from the resistor string 722 is applied. The output of the comparator/latch 754 comprises a differential output, one output 1020 connected to the D-input of the flip-flop 756 and the other input thereof connected to ground through a capacitor 1022. A clock generator 1024 is provided to receive a reset signal on an input 1026 and a clock signal (clk) on an input 1028 and generates clock signals on an output 1030. It should be understood that the output of the clock generator 1024 provides multiple clocks, which will be described herein below. Select clock signals out of the clock generator 1024 are input to a clock input on the comparator/latch 754 and to an inverted clock input on the flip-flop 756. As noted herein above, the comparator/latch 754 is operable to sense the differential voltage between the negative and positive inputs thereof and to "latch" the output at a certain time. This will then provide a logic output that is utilized by the flip-flop 756 to clock the data through to the Q-output thereof.

Figure 10B:
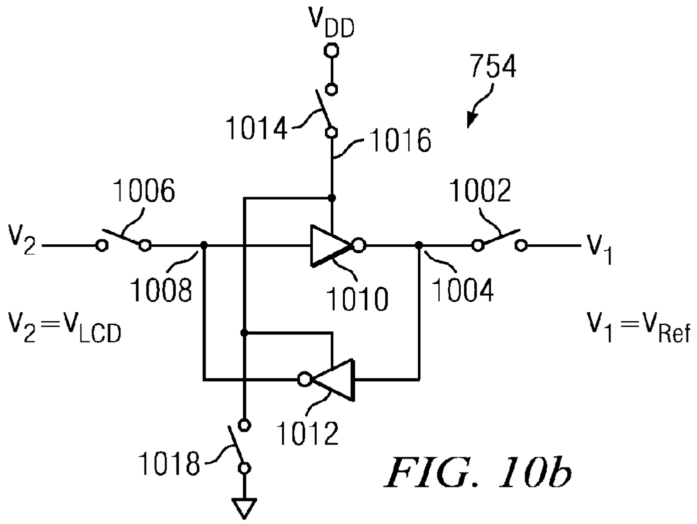
FIG. 10*b* illustrates a block diagram of the comparator circuit.

Referring now to FIG. 10*b*, there is illustrated a more simplified block diagram of the comparator/latch 754 illustrating the dynamic latch aspects thereof. The V1 voltage ($V_{REF}$) is applied across a switch 1002 that is connected between the V1 node and node 1004. The voltage V2 (tapped $V_{LCD}$ voltage) is applied through a switch 1006 which is connected to the V2 node and node 1008. An inverter 1010 has its input connected to node 1008 and its output connected to node 1004. An inverter 1012 has its input connected to node 1004 and its output connected to node 1008. Node 1008 comprises the positive output of the comparator/latch 754 while node 1004 comprises the negative output of the inverter 1010. A switch 1014 is connected between $V_{DD}$ and node 1016 connected to an input of inverter 1012 and inverter 1010. A switch 1018 is connected between node 1016 and ground. Each of the switches 1002, 1006, 1014 and 1018 are controlled responsive to a clock signal applied to control the opening and closing of the switches.

In operation, comparator/latch 754 is a dynamic latch. The operational aspects thereof are that the switches 1014 and 1018 are initially open to remove power from the two inverters 1010 and 1012. The switches 1002 and 1006 are closed such that the tapped input voltage and the reference voltage are both disposed on the respective nodes 1004 and 1008. Thus, since the nodes are basically "floating," the voltages on the respective nodes $V_1$ and $V_2$ will be disposed on the respective nodes 1004 and 1008. Thereafter, switches 1002 and 1006 are open and the voltages on nodes 1004 and 1008 will remain disposed thereon, i.e., stored thereon. At that time, switches 1014 and 1018 are closed which will cause the voltages to be pulled apart, the direction depending upon their initial separation, i.e., if the voltage on node 1004 is lower than the voltage on node 1008, the voltage node 1008 will be pulled high and voltage on node 1004 will be pulled low. Thus, no power is required until the switches 1016 and 1018 are closed in order to determine the difference between the voltages, i.e., provide a comparator logic output decision.

Referring now to FIG. 11*a*, there is provided a schematic diagram of the comparator/latch 754. Node 1102 comprises the node to which the V1 voltage of FIGS. 10*a* and 10*b*, i.e., the $V_{REF}$ voltage, is applied. Node 1104 comprises the non-inverting input of the comparator/latch 754 and is the node to which the V2 voltage of FIGS. 10*a* and 10*b*, i.e., the voltage on the selected taps of resistor string 722, is applied. Switch 1002 consists of a transistor 1106 having its drain/source path connected between node 1102 and node 1108. The gate of transistor 1106 is connected to receive the CLK2B clock signal. Switch 1002 also includes a transistor 1110 having its drain/source path connected between node 1102 and 1108 and its gate is connected to receive clock signal CLK2. Switch 1006 consists of a transistor 1112 and transistor 1114. Transistor 1112 has its drain/source path connected between node 1104 and node 1117. The gate of transistor 1112 is connected to the clock signal CLK2B. Transistor 1114 has its drain/source path also connected between node 1104 and 1117. The gate of transistor 1114 is connected to receive the CLK2 clock signal. Switch 1014 of FIGS. 10*a* and 10*b* consists of transistors 1118 and 1120. Transistor 1118 has its source/drain path connected between $V_{DDEXT}$ and node 1122. The gate of transistor 1118 is connected to receive the CLK1B signal. Transistor 1120 has its source/drain path connected between node 1122 and node 1124. The source and drain of transistor 1120 are also shorted to each other. The gate of transistor 1120 is connected to receive the CLK1 signal. Switch 1018 of FIG. 10 consists of transistors 1126 and 1128. Transistor 1128 has its drain/source path connected between node 1130 and ground. The gate of transistor 1128 is connected to receive the CLK1 clock signal. Transistor 1126 has its drain/source path connected between node 1132 and node 1130 and the drain and source are also shorted to each other. The gate of transistor 1126 is connected to the CLK1B signal.

The inverters 1010 and 1012 of FIGS. 10*a* and 10*b* consist of transistors 1134, 1136, 1138, 1140, 1142 and 1144. Transistor 1134 has its source/drain path connected between node 1124 and node 1108. The gate of transistor 1134 is connected to node 1117. Transistor 1136 has its source/drain path connected between node 1124 and node 1116. The gate of transistor 1136 is connected to node 1108. Transistor 1138 has its source/drain path connected between node 1108 and node 1116. The gate of transistor 1138 is connected to receive the comparator reset signal (COMPRST). Transistor 1140 has its drain/source path connected between node 1108 and node 1116. The gate of transistor 1140 is also connected to the comparator reset signal (COMPRST). Transistor 1142 has its drain/source path connected between node 1108 and node 1132. The gate of transistor 1142 is connected to node 1116. Transistor 1144 has its drain/source path connected between node 1116 and node 1132. The gate of transistor 1134 is connected to node 1108. Node 1116 comprises the output node of the comparator/latch 754. Node 1108 comprises the other output node of the comparator/latch 754. The output of the comparator/latch 754 that is provided to the flip-flop 756 is from node 1116.

Figure 11B:
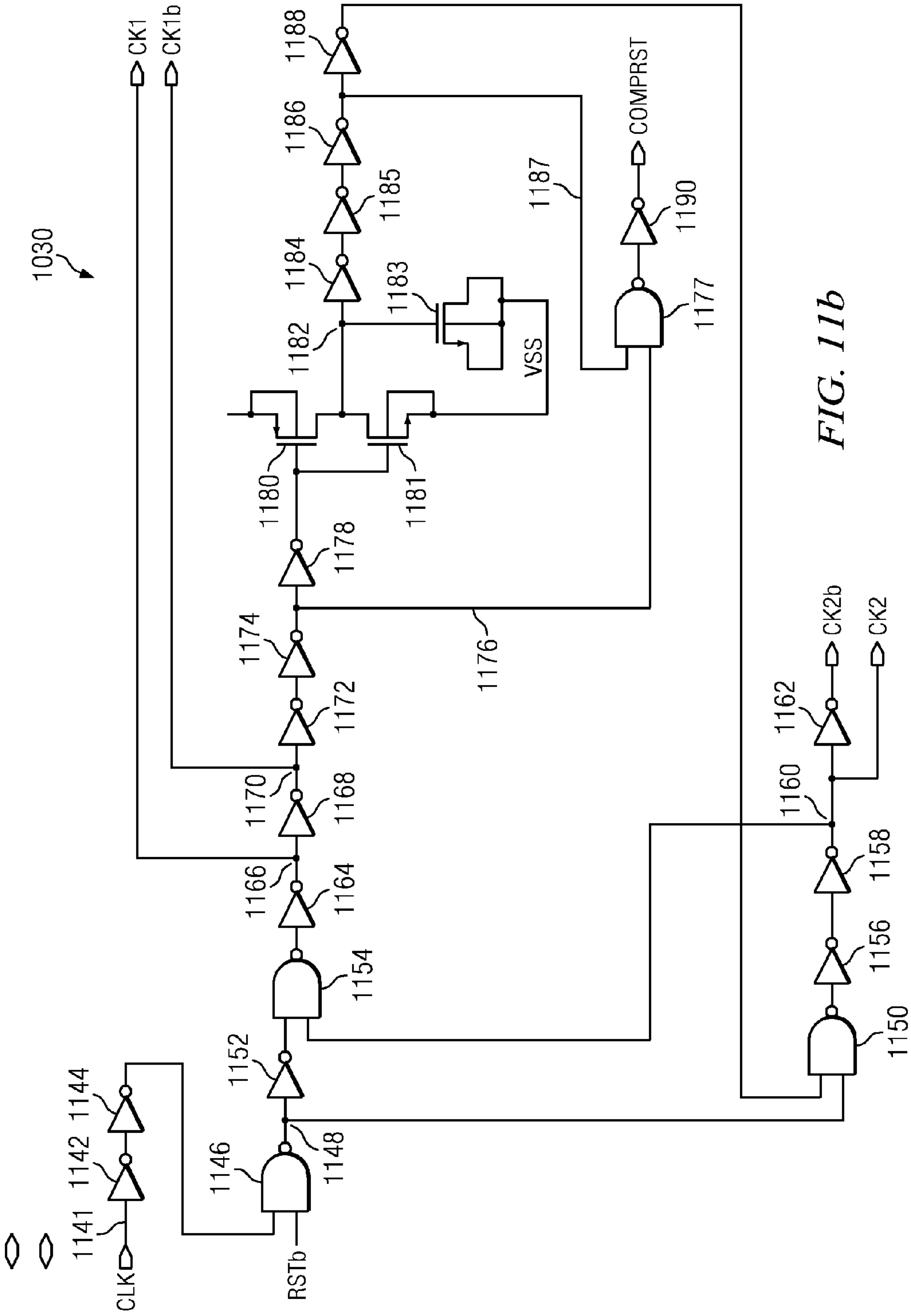
FIG. 11*b* is a logic diagram of the dynamic comparator of FIG. 10*a*
Figure 11C:
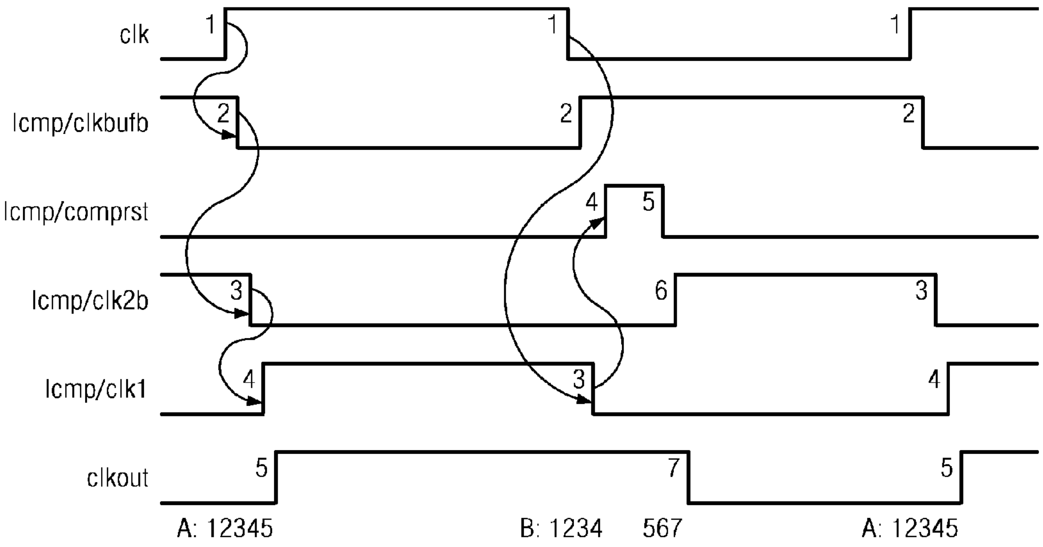
FIG. 11*c* illustrates a timing diagram for the operation of the dynamic comparator.

Referring now to FIG. 11*b*, there is illustrated a logic diagram of the clock generator 1024 of FIG. 10*a*. The CLK signal is received on input 1141 and is passed through two inverters 1142 and 1144 to provide a delayed clock output signal to one input of a NAND gate 1146, the other input of which is connected to the external RSTb signal. This is basically hooked to the $V_{DDEXT}$ input and, therefore, when the voltage is applied externally to the part, the reset signal RSTb is held high. The output of NAND gate 1146 is connected to a node 1148 that is connected to one input of a NAND gate 1150 and also connected through an inverter 1152 to one input of a NAND gate 1154. The output of NAND gate 1150 is connected through two inverters 1156 and 1158 to a node 1160 to provide the CK2 output clock, and node 1160 is also connected to the other input of a NAND gate 1154. The node 1160 is passed to an inverter 1162 to provide the CK2*b* clock signal. The output of NAND gate 1154 is passed through an inverter 1164 to provide on a node 1166 the CK1 clock signal and then through an inverter 1168 to provide on a node 1170 the CK1*b* clock signal. Node 1170 must pass through two inverters 1172 and 1174 to a node 1176 which is connected to one input of a NAND gate 1177. Node 1176 is also passed through an inverter 1178 to the gates of a series connected pair of P-channel and N-channel transistors 1180 and 1181 that are connected between $V_{DDEXT}$ and $V_{SS}$. The common connection between the two is connected to a node 1182 which is connected to one side of a MOS capacitor 1183. The node 1182 is passed through three inverters 1184, 1185 and 1186 to a node 1187 which is connected to the other input of a NAND gate 1177. The node 1187 is passed through an inverter 1188 to the other input of NAND gate 1150. The output of NAND gate 1177 is passed through an inverter 1190 to provide the comparator reset signal COMPRST.

The operation of the clock generator 1124 of FIG. 11*b* will be described with reference to the timing diagram of FIG.

11*c*. The CLK signal is received and initiates the dynamic latch operation. The NAND gate 1146 is active since the RSTb signal is high. This results in the CLK2*b* signal being output from inverter 1162. However, it is noted that CK2 is generated on node 1160 and, when this goes high, the second input of NAND gate 1154 goes high thus enabling gate 1154. Since the clock signal CK1 is generated from the output of the NAND gate 1154 through inverter 1164, there will be a delay equal to the delay through NAND gate 1154 and inverter 1164 until CK1 is generated relative to CK2. CK2*b* has one delay associated with it due to inverter 1162. Therefore, there will be a delay between CK1 and CK2*b* due to the additional delay of the NAND gate 1154. Thus, there will be a small delay between the falling edge of CLK2*b* and the rising edge of CLK1. The reset signal is generated from the clock string associated with the generation of CLK1. When CLK goes low, CLKBUF goes low at the output of inverter 1152 turning off gate 1154. This causes node 1176 to go high after four inverter delays associated with each of the inverters 1164, 1168, 1172 and 1174. At this time, the signal on node 1187 at the output of inverter 1186 is still high, as the logic state of NAND gate 1154 has not yet propagated therethrough. Node 1187 will remain high for the time required for the logic state on node 1166 to propagate through inverter 1178, transistors 1180 and 1181, inverters 1184, 1185 and 1186. At this time, the comparator reset COMPRST will go low.

Figure 12A:
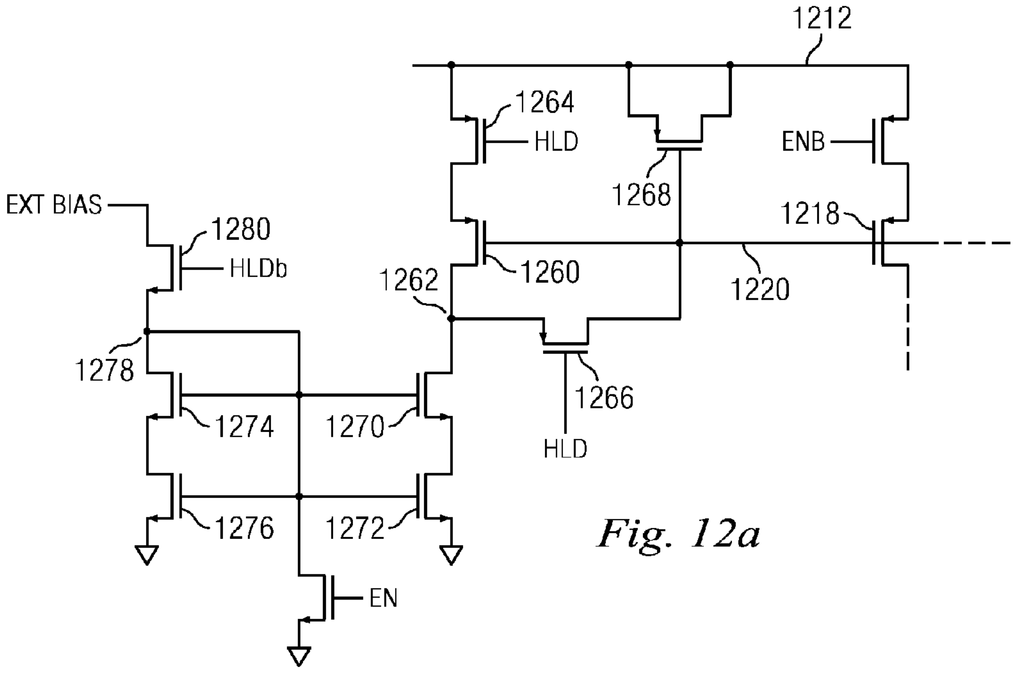
FIG. 12*a* illustrates a schematic diagram of the bias circuit for the oscillator.
Figure 12:
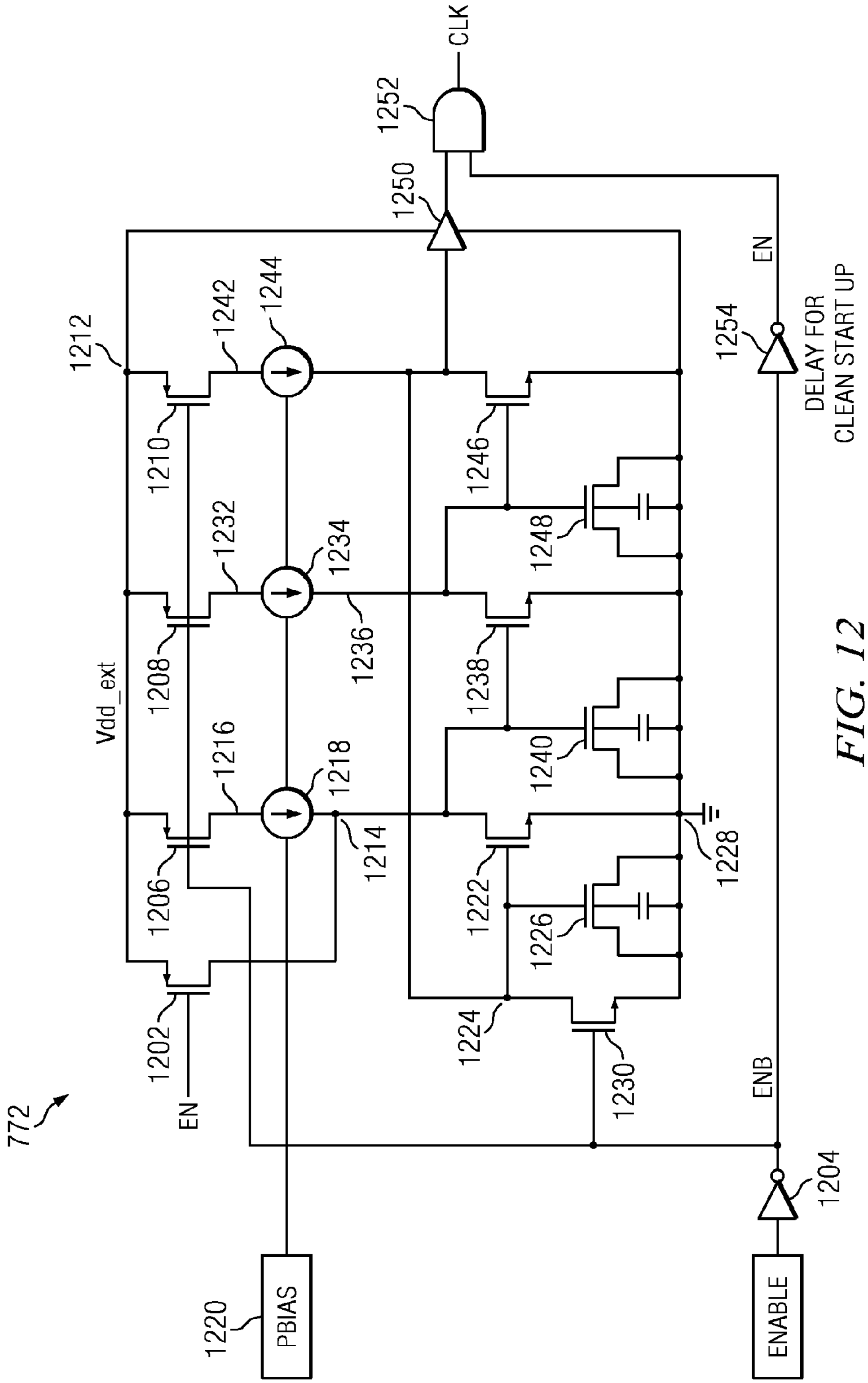
FIG. 12 is a schematic diagram of the oscillator circuit.

Referring now to FIG. 12, there is illustrated a schematic diagram of the oscillator 772 (FIG. 7). The enable input from the AND gate 770 is applied at the gate of transistor 1202 and to the input of an inverter 1204. The output of the inverter 1204 is also provided to a number of resistors in parallel including transistors 1206, 1208 and 1210. Transistor 1202 is connected between the $V_{DDEXT}$ node 1212 and node 1214. Transistor 1206 has its source/drain path connected between the $V_{DDEXT}$ node 1212 and node 1216. A current source 1218 which is used for providing the bias current responsive to a provided bias input from node 1220 is connected between node 1216 and node 1214. Transistor 1222 has its drain/source path connected between node 1214 and ground. The gate of transistor 1222 is connected to node 1224. The gate of transistor 1226 is also connected to node 1224. The drain and source of transistor 1226 are connected to ground. The configuration of transistor 1226 acts as an MOS capacitor between node 1224 and the ground node 1228. A transistor 1230 has its drain/source path connected between node 1224 and ground node 1228 and has its gate connected to the output of the inverter 1204 providing the inverted enable signal.

Transistor 1208 has its source/drain path connected between the $V_{DDEXT}$ node 1212 and node 1232. The gate of transistor 1208 is connected to the output of the inverter 1204 to receive the inverted enable signal. A current source 1234 providing the bias current is connected between node 1232 and node 1236. The current source 1234 receives a control signal from the bias node 1220. A transistor 1238 has its drain/source path connected between node 1236 and the ground node 1228. The gate of transistor 1238 is connected to node 1214. A transistor 1240 has its gate connected to node 1214. The drain and source of transistor 1240 are connected to the ground node 1228. The transistor 1240 acts as an MOS capacitor in this configuration. Transistor 1210 has its source/drain path connected between the $V_{DDEXT}$ node 1212 and node 1242. A current source 1244 provides a bias current and is connected between nodes 1242 and node 1224. The current source 1244 is controlled by the bias signal from the bias node 1220. A transistor 1246 has its drain/source path connected between node 1224 and the ground node 1228. The gate of transistor 1246 is connected to node 1236. A transistor 1248 is also connected to node 1236 and the drain and source of transistor 1248 are connected to the ground node 1228. In this configuration, similar to transistors 1226 and 1240, the transistor 1248 acts as an MOS capacitor.

An amplifier 1250 has its input connected to node 1224 and its output connected to an input of an AND gate 1252. The amplifier 1250 is also connected to the $V_{DDEXT}$ node 1212 and the ground node 1228. The second input of AND gate 1252 is connected to the output of an inverter 1254. The input of the inverter 1254 is connected to the output of inverter 1204, thus, it again inverts the previously inverted enable signal. The output of AND gate 1252 provides the clock signal from the oscillator 772 that is provided to the clock generation and level shift logic 774.

Referring now to FIG. 12*a*, there is illustrated a schematic diagram of the pre-bias circuit. The pre-bias circuit is operable to provide the bias voltage to each of the current sources 1218, 1235 or 1244, being noted that each of these is a P-channel transistor having the gate thereof connected to node 1220 for the pre-bias circuit. The pre-bias circuit is comprised of a diode connected P-channel transistor 1260 having its source/drain path thereof connected between a node 1262 and the $V_{DDEXT}$ node 1212 through a switched P-channel transistor 1264. The P-channel transistor 1264 has the gate thereof connected to HLD or switching input signal. The diode connection is facilitated through a switched P-channel transistor 1266 which has the gate thereof connected to the switch signal HLD and the source/drain path thereof connected between node 1262 and node 1220. There is an MOS capacitor provided with a P-channel transistor 1268 having the gate thereof connected to node 1220 and the source and drain connections thereof made to node 1212 for connection to $V_{DDEXT}$. When transistor 1264 and 1266 are conducting, transistor 1260 is a diode connected P-channel transistor.

Node 1262 is connected to ground or $V_{SS}$ through two series connected N-channel transistors 1270 and 1272. The gates of transistors 1270 and 1272 are connected to the gates of mirrored N-channel transistors 1274 and 1276 connected in series between a node 1278 and $V_{SS}$. The gates of both transistors 1274 and 1276 are connected to node 1278 to provide a diode connection configuration. The node 1278 is connected through a switching N-channel transistor 1280 to an external bias source of current provided by the bandgap generator. When the switching signal HLDb is high, transistor 1280, transistor 1264 and transistor 1266 are connected and the current flowing through transistors 1274 and 1276 will be mirrored over to the leg comprised of transistors 1264, 1260, 1270 and 1272. Since transistor 1260 is diode connected, this will mirror the same current over to the current sources 1218, 1234 and 1244 in accordance with the ratio of the respective transistors. During operation, it can be seen that the voltage on node 1220, i.e., the bias voltage, will be stored on the capacitor formed by the MOS capacitor 1268. To maintain this voltage thereon, the transistor 1266 is opened during low power mode, i.e., when the HLD signal is low, and the bias voltage will be maintained for current sources 1218, 1234 and 1244 from node 1220 of the prebias circuit. Additionally, since it is not necessary to drive current through the transistor 1260, the current through transistors 1274 and 1276 is disabled with the switching transistor 1280 in the low power mode when the HLD signal is low. This reduces the amount of continuous current provided by the bias circuit, i.e., it effectively disables the bias circuit in low power mode with periodic refresh, as will be described herein below.

In operation, when the bias circuit is disabled, with reference to FIG. 12, the bias voltage will be provided from node 1220 to maintain current sources 1218, 1234 and 1244 in an active state. When the bias circuit is in the disabled mode less current is flowing through transistors 1260, 1274, 1276 and 1280 reducing the power requirements of the oscillator and bias circuitry. When the bias circuit is enabled, the external bias voltage charges the capacitor formed by capacitor 1268 to maintain the voltage at node 1220. The HLD signal would normally go high to charge the node 1220 at a rate of 1 kHz.

When the oscillator is enabled, the output of inverter 1204 will be a logic "high" which will turn on transistor 1230 which will pull node 1224 low discharging capacitor 1226 and turning off transistor 1222. This will allow capacitor 1240 to charge up turning on transistor 1238 and pulling node 1236 low discharging capacitor 1248 and turning off transistor 1246. However, since node 1224 is connected to the output on the top of the source/drain path of transistor 1246, this will pull the output low. Thus, current source 1218 and 1244 will provide current whereas current source 1234 will not provide current to node 1236. The output of the oscillator will thus be a logic "low" for input to the AND gate 1252. This will preset the oscillator. When the enable signal goes low at the gate of transistor 1230, this will allow the oscillator to begin working and operate as a loop oscillator such that capacitor 1226 charges up from current source 1244 and turns on transistor 1222, initiating a ring oscillator. At the same time, the switch signal will close and bias will be provided by the circuit of FIG. 12*a*.

Figure 13:
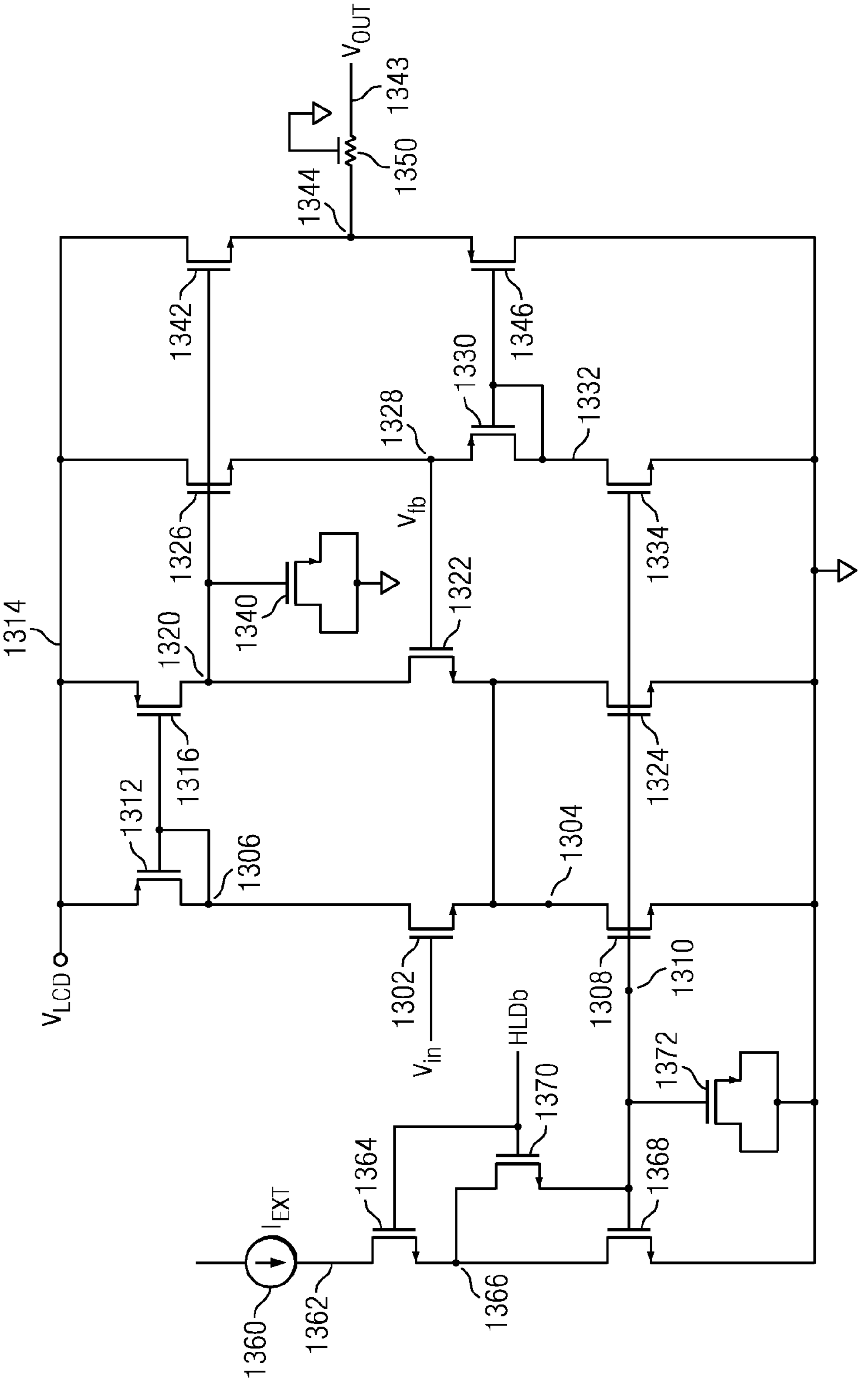
FIG. 13 is a schematic diagram of the buffer circuitry.

Referring now to FIG. 13, there is illustrated a schematic diagram of the buffer circuits. The input voltage is input to the gate of a transistor 1302 which has the source/drain path thereof connected between a common source node 1304 and a node 1306. Node 1304 is connected to one side of the source/drain path of a transistor 1308, the other side thereof connected to ground. The gate of transistor 1308 is connected to a bias voltage node 1310. Node 1306 is connected to one side of the source/drain path of a P-channel transistor 1312, the other side thereof connected to $V_{LCD}$ on a node 1314. The gate of transistor 1312 is connected to node 1306 in a diode configuration. The transistor 1312 and transistor 1302 provide one side of a differential amplifier pair. The other side provided by a P-channel transistor 1316 having a source/drain path thereof connected between $V_{LCD}$ on node 1314 and a node 1320, the gate thereof connected to node 1306, and an N-channel transistor 1322 having the source/drain path thereof connected between node 1320 and node 1304. A second N-channel transistor 1324 is connected in parallel with transistor 1308. Each of transistors 1308 and 1324, in the current embodiment, provide for 50 nA of current therethrough for a total of 100 nA through the differential pair. This is a unitary gain amplifier, therefore, the current through both transistors 1302 and 1322 will be balanced when operating. An output leg is provided wherein the node 1320 is connected to the gate of an N-channel transistor 1326 which is a source follower transistor, the source/drain path thereof connected between the $V_{LCD}$ node 1314 and a node 1328. Node 1328 is a feedback node that is connected to the gate of transistor 1322. Node 1328 is connected to one side of the source/drain path of the P-channel transistor 1330, the other side thereof connected to a node 1332 and the gate of transistor 1330 is connected to the node 1332 to provide a diode configuration. Node 1332 is connected to one side of the source/drain path of an N-channel transistor 1334, the other side thereof connected to ground, the gate thereof connected to the bias node 1310.

In operation, when $V_{IN}$ increases such that it is at a voltage above the voltage on node 1328, the feedback voltage $V_{fb}$, what will happen is that the current through transistor 1302 and 1312 will increase and the current through transistor 1316 and transistor 1322 will decrease and the voltage on node 1320 will rise. When the voltage on node 1320 rises, this causes the voltage on the gate of transistor 1326 to increase thus increasing the voltage on node 1328. As the voltage on node 1328 increases, this will cause the current through transistors 1316 and 1322 to increase, thus balancing the voltages on the two transistors 1302 and 1322 such that they will be equal. The voltage on node 1328 will represent the output voltage. An MOS capacitor 1340 is provided between node 1320 and ground to provide loop stability.

To isolate the actual output on a node 1343 from the actual loop from a stability standpoint, an additional output leg is provided which is substantially identical to the output leg comprising transistor 1326, 1330 and 1334. This is comprised of an N-channel source follower transistor 1342 connected between $V_{LCD}$ node 1314 and node 1344, node 1344 connected to one side of the source/drain path of the P-channel transistor 1346, the other side thereof connected to ground. Node 1344 is connected through an MOS resistor 1350 to node 1343. The gate of transistor 1346 is connected to the gate of transistor 1330 at node 1332. Thus, when the voltage on node 1320 increases the voltage on node 1344 will track the voltage on node 1328. Similarly, there will be a "diode drop" across transistor 1330 that will pull node 1332 to one $V_{GS}$ below node 1328. This will cause the gate of transistor 1346 to also be pulled down to one $V_{GS}$ below node 1344, thus turning on transistor 1346. This configuration isolates node 1344 from the feedback loop associated with node 1328 and transistor 1322.

The bias circuitry for providing the bias on node 1310 is similar to the bias circuitry for the current controlled oscillator 772. However, the buffer requires the current to continually flow through transistors 1312 and 1316 during operation thereof. This particular bias circuit utilizes a current leg comprised of an input external of a current source 1360 that drives a node 1362. Node 1362 is connected to one side of a switching N-channel transistor 1364, the other side thereof connected to a node 1366. Node 1366 is connected to one side of the source/drain path of N-channel transistor 1368, the other side thereof connected to ground. The gate of transistor 1368 is connected to node 1310. A second switching N-channel transistor 1370 has its source/drain path thereof connected between node 1366 and the gate of transistor 1368 to provide a diode connection therefore when transistor 1370 conducts. The gate of transistor 1370 and the gate of transistor 1368 are connected to a control signal HLDb. A storage capacitor is provided by a MOS capacitor 1372 connected between node 1310 and ground which is comprised of a MOS transistor having a gate thereof connected to node 1310 and the drain and source thereof connected together and to ground.

In operation, when transistors 1364 and 1370 are connected together, i.e., when HLDb is high, the current source 1360 from the bandgap generator will provide current to transistor 1368 on that leg. This will be mirrored over to transistor 1308 and 1324. The current through transistor 1368 is designed to be 100 nA. Since there are provided two transistors 1308 and 1324, the transistor 1368 provides one-half the current required by transistors 1308 and 1324. At this point, the voltage from node 1310 is stored on capacitor 1372. Thus, when HLDb goes low, when the Hold signal is high, this will cause transistors 1364 and 1370 to be turned off, thus removing the current drain through transistor 1368. This reduces the amount of current by approximately 100 nA during the hold period. However, bias voltage on node 1310 is still applied to transistors 1308, 1324 and 1334. This will allow the buffer to operate for a predetermined amount of time, depending upon how long the charge can be maintained on node 1310. In the exemplary embodiment, this operation requires the capacitor 1372 to periodically be refreshed. In the exemplary embodiment, this is achieved by turning on transistors 1364 and 1370 for a short period of time every cycle of a 1 kHz clock. By utilizing the RTC clock at 32 kHz, one cycle out of every thirty-two cycles is selected for pulling HLDb high. For the remaining thirty-one cycles of the 32 kHz clock, HLDb is pulled low. Thus, the refresh cycle is at 1 kHz. Of course, this can be at any rate, depending upon the amount of time that it is determined that the operation is within acceptable operating limits for the bias provided on node 1310.

Figure 14A:
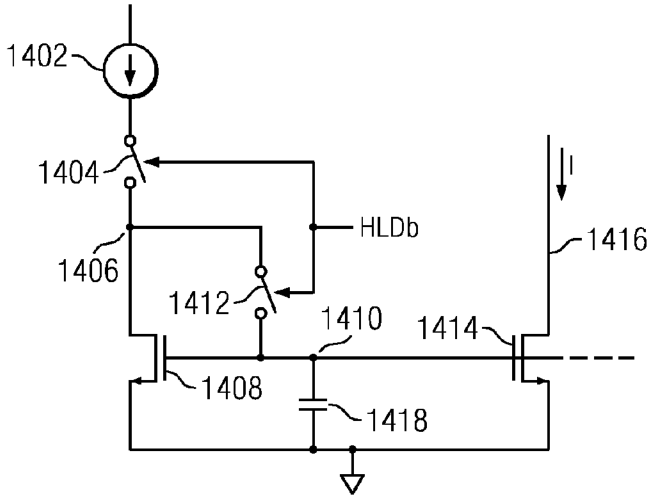
FIGS. 14*a* and 14*b* illustrate simplified schematic diagrams of the bias circuitry for the oscillator and buffer.
Figure 14B:
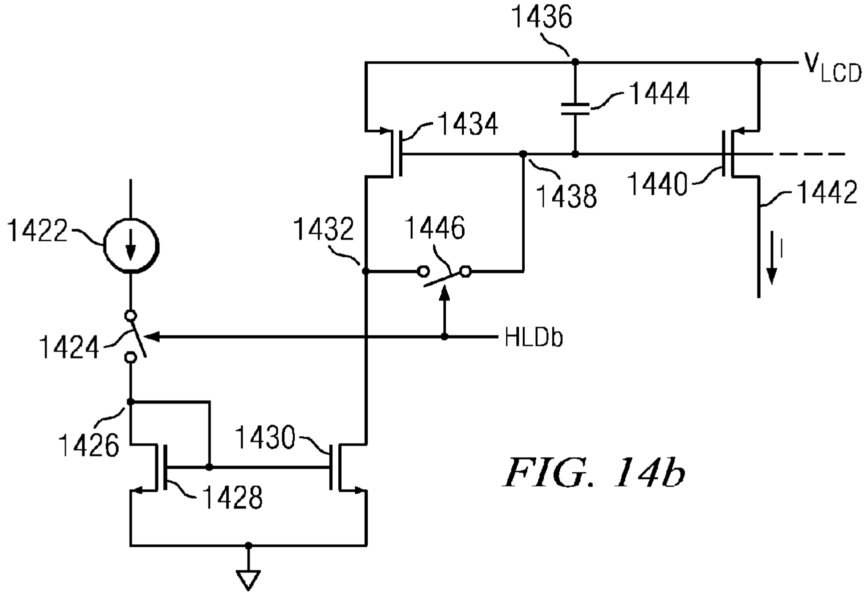

Referring now to FIGS. 14*a* and 14*b*, there are illustrated simplified diagrammatic views of each of the bias control circuits for both the current controlled oscillator and the buffer circuit. FIG. 14*a* is the bias control circuit for the buffer circuit and FIG. 14*b* is the bias control circuit for the current control oscillator. Referring specifically to FIG. 14*a*, current from the bandgap generator is provided by an external current source 1402 which drives the switch 1404 that is controlled by the HLDb signal. The other side of the switch is connected to a node 1406 that is connected to one side of the source/drain path of an N-channel transistor 1408, the other side thereof connected to ground. The gate of transistor 1408 is connected to a node 1410 and also to one side of a switch 1412, the other side thereof connected to node 1406. When switch 1412 is closed, node 1406 is connected to node 1410 and the transistor 1408 is a diode configuration. Switch 1412 is controlled by the HLDb control signal. Node 1410 drives the gate of N-channel transistor 1414 having the source/drain path thereof connected between a current input node 1416 and ground. Thus, when switch 1404 and switch 1412 are closed, the transistor leg with transistor 1408 mirrors the current therethrough over to the leg having the transistor 1414 contained therein. A capacitor 1418 is connected between node 1410 and ground and, when switches 1404 and 1412 are open, when HLDb is "low," then the voltage on node 1410 will be held there by the capacitor 1418 such that the bias voltage to transistor 1414 will be maintained to define the current therethrough.

Specifically referring to FIG. 14*b*, an external current is provided from the bandgap generator through a current source 1422 to one side of a switch 1424, the other side thereof connected to a node 1426. Switch 1424 is controlled by the HLDb signal. Node 1426 is connected to one side of the source/drain path of an N-channel transistor 1428, the other side thereof connected to ground, the gate thereof connected to node 1426 in a diode configuration. The gate of transistor 1428 is connected to the gate of N-channel transistor 1430, the source/drain path thereof connected between ground and a node 1432. The source/drain path of P-channel transistor 1434 is connected between node 1432 and a $V_{LCD}$ node 1436 with the gate thereof connected to a node 1438. Node 1438 is connected to the gate of a P-channel transistor 1440, the source/drain path thereof connected between the $V_{LCD}$ node 1436 and a current node 1442. A capacitor 1444 is connected between the $V_{LCD}$ node 1436 and the node 1438. A switch 1446 is connected between node 1438 and node 1432 and controlled by the HLDb signal that, when closed, will result in a diode configured transistor with transistor 1434. During operation, when switch 1424 is closed, the current through transistor 1428 will be defined by the current source 1422 and this will be mirrored to the current leg with transistors 1430 and 1428. When switch 1446 is closed, this will result in the current therethrough being mirrored to the leg associated with transistor 1440 to provide the current output. This is a current mirror configuration that provides a bias current by defining the voltage on node 1438. When the switches 1424 and 1446 are open, the current through transistor 1428 will be reduced to zero and the current through transistor 1434 will be reduced to zero. When switch 1446 is open, the voltage on node 1432 will not change and will be held there as a result of the capacitor 1444. This will define the bias voltage on the gate of the transistor 1440, thus allowing current to be sourced therethrough.

It will be appreciated by those skilled in the art having the benefit of this disclosure that this system and method for LCD loop control provides a improved loop control operation of the LCD controller. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An LCD controller, comprising:

a charge pump circuit for generating a charge voltage responsive to an external voltage and a clock signal;

an oscillator for generating the clock signal responsive to an oscillator control signal;

an LCD driver voltage circuit for generating a plurality of LCD driver voltages for driving segments of an LCD display; and loop control circuit for monitoring an LCD driver voltage from the LCD driver voltage circuit and generating the oscillator control signal responsive thereto to enable and disable the oscillator by using a latch, the loop control circuit further comprising:

a comparator for comparing the LCD driver voltage with a reference voltage and generating an output at a first logical level when the LCD driver voltage exceeds the reference voltage by a first predetermined level and generating the output at a second logical level when the LCD driver voltage falls below the reference voltage by a second predetermined level;

wherein the latch latches the output at either the first logical level or the second logical level; and control logic for generating the oscillator control signal to enable the oscillator responsive to the output at the second logical level and for generating the oscillator control signal to disable the oscillator responsive to the output at the first logical level.

2. The LCD controller of claim 1, wherein the loop control circuit generates the oscillator control signal to enable the oscillator responsive to the LCD driver voltage falling below a first predetermined voltage level and generates the oscillator control signal to disable the oscillator responsive to the LCD driver rising above a second predetermined voltage level.

3. The LCD controller of claim 1, wherein the LCD driver voltage circuit further comprises a voltage divider including a plurality of resistors in series, wherein each of the plurality of voltages are provided from a point on the resistor divider.

4. The LCD controller of claim 1, wherein the loop control circuit further comprises:

a multiplexer for selecting the LCD driver voltage from the LCD driver voltage circuit; and a contrast control circuit for controlling the selection of the LCD driver voltage by the multiplexer.

5. The LCD controller of claim 1, wherein the control logic further enables/disables the LCD display responsive to an enable control signal.

6. The LCD controller of claim 1, further including a bandgap generator for generating the reference voltage.

7. An LCD controller, comprising:

a charge pump circuit for generating a charge voltage responsive to an external voltage and a clock signal;

an oscillator for generating the clock signal responsive to an oscillator control signal;

an LCD driver voltage circuit for generating a plurality of LCD driver voltages for driving segments of an LCD display, the LCD driver voltage circuit further including a voltage divider including a plurality of resistors in series, wherein each of the plurality of voltages are provided from a point on the resistor divider;

a comparator for comparing an LCD driver voltage with a reference voltage and generating an output at a first logical level when the LCD driver voltage exceeds the reference voltage by a first predetermined level and generating the output at a second logical level when the LCD driver voltage falls below the reference voltage by a second predetermined level, wherein the reference voltage is generated by using a bandgap generator;

a latch for latching the output at either the first logical level or the second logical level; and control logic for generating the oscillator control signal to enable the oscillator responsive to the output at the second logical level and for generating the oscillator control signal to disable the oscillator responsive to the output at the first logical level.

8. The LCD controller of claim 7, further comprising:

a multiplexer for selecting the LCD driver voltage from the LCD driver voltage circuit; and a contrast control circuit for controlling the selection of the LCD driver voltage by the multiplexer.

9. The LCD controller of claim 7, wherein the control logic further enables/disables the LCD display responsive to an enable control signal.

10. The LCD controller of claim 7, further including a bandgap generator for generating the reference voltage.

11. A method for generating an LCD display driver voltage from an LCD controller, comprising the steps of:

generating a charge voltage responsive to an external voltage and a clock signal;

generating a plurality of LCD driver voltages for driving segments of an LCD display responsive to the charge voltage;

monitoring an LCD driver voltage;

generating an oscillator control signal responsive to the monitored LCD driver voltage; and controlling operation of an oscillator responsive to the oscillator control signal to generate the clock signal by using a latch, wherein generating the oscillator control signal further comprises:

comparing the LCD driver voltage with a reference voltage;

generating an output at a first logical level when the LCD driver voltage exceeds the reference voltage by a first predetermined level;

using the latch to latch the output at either the first logical level; and generating the oscillator control signal to disable the oscillator responsive to the output at the first logical level.

12. The method of claim 11, wherein the step of generating an oscillator control signal further comprises the steps of:

generating the oscillator control signal to enable the oscillator responsive to the LCD driver voltage falling below a first predetermined voltage level; and generating the oscillator control signal to disable the oscillator responsive to the LCD driver rising above a second predetermined voltage level.

13. The method of claim 11, wherein the step of generating a plurality of LCD driver voltages further comprises the step of outputting a voltage from a point on a voltage divider circuit.

14. The method of claim 11, wherein the step of monitoring further comprises the steps of:

multiplexing to an output the LCD driver voltage from a plurality of voltages associated with the plurality of LCD driver voltages; and generating a contrast control signal to select the voltage to output as the LCD drive voltage.

15. The method of claim 11, wherein the step of generating the oscillator control signal further comprises the steps of:

generating the output at a second logical level when the LCD driver voltage falls below the reference voltage by a second predetermined level;

using the latch to latch the output at either the second logical level; and generating the oscillator control signal to enable the oscillator responsive to the output at the second logical level.

16. The method of claim 11 further comprising the step of disabling the LCD display responsive to an enable control signal.

17. The method of claim 11 further including the step of generating the reference voltage using a bandgap generator.

18. The method of claim 11 further comprising the step of enabling/disabling the LCD display responsive to an enable control signal.

* * * * *